United States Patent
Sueoka et al.

(10) Patent No.: US 10,704,480 B2
(45) Date of Patent: Jul. 7, 2020

(54) CONTROL SYSTEM FOR COMPRESSION-IGNITION ENGINE

(71) Applicant: Mazda Motor Corporation, Aki-gun, Hiroshima (JP)

(72) Inventors: Masanari Sueoka, Hiroshima (JP);
Takuya Ohura, Hiroshima (JP);
Tatsuhiro Tokunaga, Aki-gun (JP);
Keiji Maruyama, Hiroshima (JP);
Tomohiro Nishida, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/189,881

(22) Filed: Nov. 13, 2018

(65) Prior Publication Data
US 2019/0186396 A1 Jun. 20, 2019

(30) Foreign Application Priority Data
Dec. 15, 2017 (JP) .................. 2017-240660

(51) Int. Cl.
*F02D 41/00* (2006.01)
*F02B 1/14* (2006.01)
(Continued)

(52) U.S. Cl.
CPC ............ *F02D 41/0057* (2013.01); *F02B 1/10* (2013.01); *F02B 1/14* (2013.01); *F02B 31/06* (2013.01);
(Continued)

(58) Field of Classification Search
CPC ............ F02D 41/0057; F02D 41/402; F02D 41/0077; F02D 41/3041; F02D 13/0261;
(Continued)

(56) References Cited

U.S. PATENT DOCUMENTS 4,325,346 A * 4/1982 Yokoyama ............ F02B 31/08
123/184.39
4,465,034 A * 8/1984 Tsutsumi ................ F02B 31/06
123/184.21
(Continued)

FOREIGN PATENT DOCUMENTS

EP 0894957 A2 2/1999
JP S60150413 A 8/1985
(Continued)

OTHER PUBLICATIONS

European Patent Office, Extended European Search Report Issued in Application No. 18209031.6, dated May 23, 2019, Germany, 30 pages.
(Continued)

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

A control system for a compression-ignition engine is provided, which includes an engine having a combustion chamber, an injector, a spark plug, a swirl valve provided to an intake passage of the engine, and a controller connected to the injector, the spark plug, and the swirl valve to control them. The controller includes a processor configured to execute a swirl adjusting module to control an opening of the swirl valve so as to make the opening of the swirl valve smaller as an engine speed decreases and output a control signal to the injector to inject the fuel after the control of the swirl valve, and a combustion controlling module to output an ignition instruction to the spark plug so as to ignite at a given ignition timing after the EGR ratio adjustment, so that partial compression-ignition combustion is performed.

8 Claims, 18 Drawing Sheets

(51) Int. Cl.
- *F02B 1/10* (2006.01)
- *F02D 41/30* (2006.01)
- *F02D 13/02* (2006.01)
- *F02D 41/40* (2006.01)
- *F02B 31/06* (2006.01)
- *F02M 26/33* (2016.01)
- *F02B 1/02* (2006.01)
- *F02B 23/10* (2006.01)
- *F02B 1/12* (2006.01)
- *F02D 35/02* (2006.01)

(52) U.S. Cl.
CPC ..... *F02D 13/0261* (2013.01); *F02D 41/0077* (2013.01); *F02D 41/3041* (2013.01); *F02D 41/401* (2013.01); *F02D 41/402* (2013.01); *F02B 1/02* (2013.01); *F02B 1/12* (2013.01); *F02B 2023/108* (2013.01); *F02B 35/023* (2013.01); *F02D 41/006* (2013.01); *F02D 41/0065* (2013.01); *F02D 41/3047* (2013.01); *F02D 2041/0015* (2013.01); *F02M 26/33* (2016.02)

(58) Field of Classification Search
CPC .. F02D 41/401; F02D 41/3047; F02D 35/023; F02D 2041/0015; F02D 41/0065; F02D 41/006; F02B 31/06; F02B 1/14; F02B 1/10; F02B 1/02; F02B 2023/108; F02B 1/12; F02M 26/33
See application file for complete search history.

(56) References Cited

U.S. PATENT DOCUMENTS

| | | | | |
|---|---|---|---|---|
| 4,548,172 A | * | 10/1985 | Bailey | F02B 1/02 123/297 |
| 4,733,642 A | * | 3/1988 | Ishida | F02B 1/12 123/263 |
| 4,753,200 A | * | 6/1988 | Kawamura | F02D 41/0002 123/188.14 |
| 5,146,885 A | * | 9/1992 | Fukuma | F02D 41/1475 123/308 |
| 5,323,748 A | * | 6/1994 | Foster | F02D 35/023 123/435 |
| 6,006,718 A | * | 12/1999 | Ishihara | F02B 31/085 123/295 |
| 6,092,502 A | * | 7/2000 | Atago | F02B 31/06 123/301 |
| 2001/0006054 A1 | * | 7/2001 | Yoshizawa | F02B 1/12 123/295 |
| 2007/0062484 A1 | * | 3/2007 | Yang | F02D 35/028 123/295 |
| 2007/0062486 A1 | * | 3/2007 | Yang | F02B 11/00 123/305 |
| 2011/0180035 A1 | * | 7/2011 | Durrett | F02B 17/005 123/295 |
| 2012/0118267 A1 | * | 5/2012 | Kang | F02D 41/3041 123/406.26 |
| 2017/0284329 A1 | * | 10/2017 | Ashizawa | F02D 41/3047 |
| 2017/0292462 A1 | * | 10/2017 | Tsuda | F02B 11/00 |
| 2018/0216592 A1 | * | 8/2018 | Sakai | F02M 61/162 |
| 2019/0063344 A1 | * | 2/2019 | Matsumoto | F02D 37/02 |

FOREIGN PATENT DOCUMENTS

| | | | | |
|---|---|---|---|---|
| JP | 63009669 A | * | 1/1988 | |
| JP | 06101484 A | * | 4/1994 | |
| JP | 09195839 A | * | 7/1997 | ......... F02D 41/0002 |
| JP | 2002371856 A | | 12/2002 | |
| JP | 2003049691 A | | 2/2003 | |
| JP | 2009108777 A | | 5/2009 | |
| JP | 2009108778 A | | 5/2009 | |
| WO | 2016035276 A1 | | 3/2016 | |

OTHER PUBLICATIONS

Persson, H et al., "The Effect of Swirl on Spark Assisted Compression Ignition (SACI)," SAE International, Jul. 23, 2007, 11 pages.

* cited by examiner

CONTROL SYSTEM FOR COMPRESSION-IGNITION ENGINE

TECHNICAL FIELD

The present disclosure relates to a control system for a compression-ignition engine, which performs partial compression-ignition combustion in which a mixture gas within a cylinder is partially combusted by spark ignition (SI combustion) and then the remaining mixture gas within the cylinder is combusted by self-ignition (CI (compression ignition) combustion).

BACKGROUND OF THE DISCLOSURE

Recently, Homogeneous-Charge Compression Ignition (HCCI) combustion in which gasoline fuel mixed with air is combusted by self-ignition inside a sufficiently compressed combustion chamber has attracted attention. The HCCI combustion is a mode in which the mixture gas combusts at a plurality of positions simultaneously, and thus has a faster combustion speed of the mixture gas than in SI combustion (spark ignition combustion) which is adopted for general gasoline engines. Therefore, the HCCI combustion is said to be significantly advantageous in terms of thermal efficiency. However, the HCCI combustion has issues such as a combustion start timing of the mixture gas (a timing at which the mixture gas self-ignites) greatly varying due to external factors (e.g., atmospheric temperature) and control during a transient operation in which an engine load sharply changes being difficult.

Therefore, instead of combusting all of the mixture gas by self-ignition, it is proposed to combust a portion of the mixture gas by spark ignition using a spark plug. That is, after forcibly combusting a portion of the mixture gas through flame propagation caused by spark ignition (SI combustion), the remaining mixture gas is combusted by self-ignition (CI combustion). Hereinafter, such combustion is referred to as "partial compression-ignition combustion."

For example, JP2009-108778A discloses an engine adopting a similar concept to the partial compression-ignition combustion. This engine causes flame propagation combustion by spark-igniting a stratified mixture gas which is formed around a spark plug by a supplementary fuel injection, and then performs a main fuel injection inside a combustion chamber warmed up by an effect of the flame propagation combustion, so as to combust the fuel injected in the main fuel injection through self-ignition.

Although the engine of JP2009-108778A can stimulate CI combustion by the spark ignition using the spark plug, a state of a flame core formed immediately after the spark ignition is considered to vary to some extent due to an environment of the combustion chamber. For example, when an engine speed is low, since flow within the combustion chamber easily reduces, the flame core after the spark ignition may not grow as expected. When the growth of the flame core is insufficient, a start timing of the CI combustion may greatly deviate from a target timing and the combustion may become unstable.

SUMMARY OF THE DISCLOSURE

The present disclosure is made in view of the above situations and aims to provide a control system for a compression-ignition engine, which secures high combustion stability regardless of an engine speed.

In order to solve the above issues, according to one aspect of the present disclosure, a control system for a compression-ignition engine is provided, which includes an engine having a combustion chamber formed by a cylinder, a piston and a cylinder head, an injector attached to the engine and configured to supply fuel into the combustion chamber, a spark plug disposed to be oriented into the combustion chamber, a swirl valve provided to an intake passage of the engine, and a controller connected to the injector, the spark plug, and the swirl valve and configured to output a control signal to the injector, the spark plug, and the swirl valve, respectively. The controller includes a processor configured to execute a swirl adjusting module to change an opening of the swirl valve, the swirl adjusting module outputting a control signal to the swirl valve to make the opening of the swirl valve smaller as an engine speed decreases and outputting a control instruction to the injector to inject the fuel after the control of the swirl valve, and a combustion controlling module to output an ignition instruction to the spark plug so as to ignite at a given ignition timing after the EGR ratio adjustment, so that partial compression-ignition combustion in which the mixture gas combusts by flame propagation and then combusts by compression ignition is performed.

According to another aspect of the present disclosure, a control system for a compression-ignition engine is provided, the engine including an injector configured to supply fuel into a combustion chamber and a spark plug configured to ignite a mixture gas containing fuel supplied from the injector and air, the engine performing partial compression-ignition combustion including spark ignition (SI) combustion performed by combusting a portion of the mixture gas through spark ignition by the spark plug, followed by compression ignition (CI) combustion performed by causing the remaining mixture gas to self-ignite. The control system includes a swirl mechanism configured to adjust an intensity of swirl flow to be generated inside the combustion chamber, and a processor configured to, during the partial compression-ignition combustion, cause the injector to inject the fuel toward the swirl flow while controlling the swirl mechanism to increase the intensity of the swirl flow as the engine speed decreases and cause the spark plug to perform spark ignition at a given ignition timing so that the SI combustion of the mixture gas is performed followed by the CI combustion.

According to this configuration, during the partial compression-ignition combustion, since the intensity of the swirl flow is increased when the engine speed is low compared to when it is high and the fuel is injected from the injector toward the swirl flow that has the increased intensity, by joining the injected fuels downstream of the swirl flow, a relatively rich mixture gas is formed. Further, by performing the spark ignition on the relatively rich mixture gas, a stable flame core is formed within the mixture gas. In addition, since the subsequent growth of the flame core is stimulated by a strong flow within the combustion chamber due to the swirl flow, the speed of growth of the flame core (i.e., the flame propagation speed) is sufficiently secured. Thus, even under a condition where the engine speed is low (thereby, originally, the flow within the combustion chamber easily reduces), the SI combustion progresses stably and the subsequent CI combustion is surely performed, which avoids the start timing of the CI combustion from greatly varying between cycles. As described above, according to this configuration, regardless of the engine speed being high or low, the stable partial compression-ignition combustion is achieved.

The swirl adjusting module may control the swirl valve so that a change rate of an intensity of swirl flow in a low engine speed range than a given value is less than the change rate in a high engine speed range than the given value.

According to this configuration, within the high engine speed range where the engine speed is higher than the given value, since the intensity of the swirl flow is increased as the engine speed decreases (i.e., as approaching to the given value), the above described formation of the rich mixture gas and the flow enhancement within the combustion chamber are achieved suitably according to the engine speed. On the other hand, within the low engine speed range where the engine speed is lower than the given value, if the intensity of the swirl flow is changed at the same change rate with the high engine speed range, the intensity of the swirl flow increases excessively under the lowest engine speed condition, and by the excessive flow within the combustion chamber due to the strong swirl flow, the area of the wall surface of the combustion chamber to which the mixture gas during the combustion contacts sharply increases. This causes the sharp increase of cooling loss and results in reducing fuel efficiency of the engine. In this regard, according to this configuration, the swirl valve is controlled so that the intensity of the swirl flow does not change largely or remains uniformly even when the engine speed drops below the given value. Thus, even when the engine speed is the lowest value, the intensity of the swirl flow is not extremely increased. In this manner, the sharp increase in the cooling loss is avoided and the fuel efficiency of the engine is suitably maintained.

During the partial compression-ignition combustion, the swirl adjusting module may reduce the opening of the swirl valve as the engine speed decreases.

According to this configuration, by opening and closing the swirl valve provided on the intake air introducing path, the intensity of the swirl flow is suitably adjusted. Further, during the partial compression-ignition combustion under the high speed condition, the opening of the swirl valve is increased to expand an area through which the intake air passes, thus, pumping loss is reduced.

During the partial compression-ignition combustion, the swirl adjusting module may control the opening of the swirl valve within a given opening range larger than the fully-closed state.

As described above, when the opening of the swirl valve is controlled always to be larger than the fully-closed state, the intensity of the swirl flow is not extremely increased under the lowest speed condition, and the sharp increase in the cooling loss due to the excessive flow within the combustion chamber is avoided.

At least in a part of a low engine load segment of an engine operating range where the partial compression-ignition combustion is performed, the swirl adjusting module may control the swirl valve to increase the intensity of the swirl flow as the engine speed decreases, and perform the partial compression-ignition combustion while forming an air-fuel (A/F) lean environment in which an air-fuel ratio that is a ratio of air to fuel inside the combustion chamber is larger than a stoichiometric air-fuel ratio.

According to this configuration, while the partial compression-ignition combustion is performed in an environment in which a heat capacity ratio of the mixture gas is large and which is advantageous for thermal efficiency, the combustion stability is secured suitably by the adjustment of the intensity of the swirl flow.

The injector may at least have a first nozzle port and a second nozzle port disposed at a center portion of a ceiling surface of the combustion chamber and separated from each other in a circumferential direction of the injector. The first and second nozzle ports may simultaneously inject the fuel. The swirl flow may be an inclined swirl flow flowing nonparallel to a plane perpendicular to a center axis of the combustion chamber. The first and second nozzle ports may be positioned and oriented so that a first fuel portion injected by the first nozzle port that has reached the swirl flow moves downstream along the swirl flow and then joins with a second fuel portion injected by the second nozzle port that has reached the swirl flow.

According to this configuration, by joining the fuels downstream of the swirl flow, the (rich) mixture gas at a high fuel concentration is reliably formed in the center portion of the combustion chamber which is the final destination of the swirl flow.

During the partial compression-ignition combustion, the combustion controlling module may adjust a given control amount at least including a timing of the spark ignition so that an SI ratio that is a ratio of a heat generation amount by the spark ignition combustion to a total heat generation amount matches a target SI ratio determined in advance for each operating condition of the engine.

According to this configuration, the ratio of the CI combustion is increased (i.e., the SI ratio is reduced) as much as possible within the range in which combustion noise does not become excessive, and thermal efficiency by the partial compression-ignition combustion is improved as much as possible.

DETAILED DESCRIPTION OF THE DISCLOSURE (1) Overall Configuration of Engine

Figure 1:
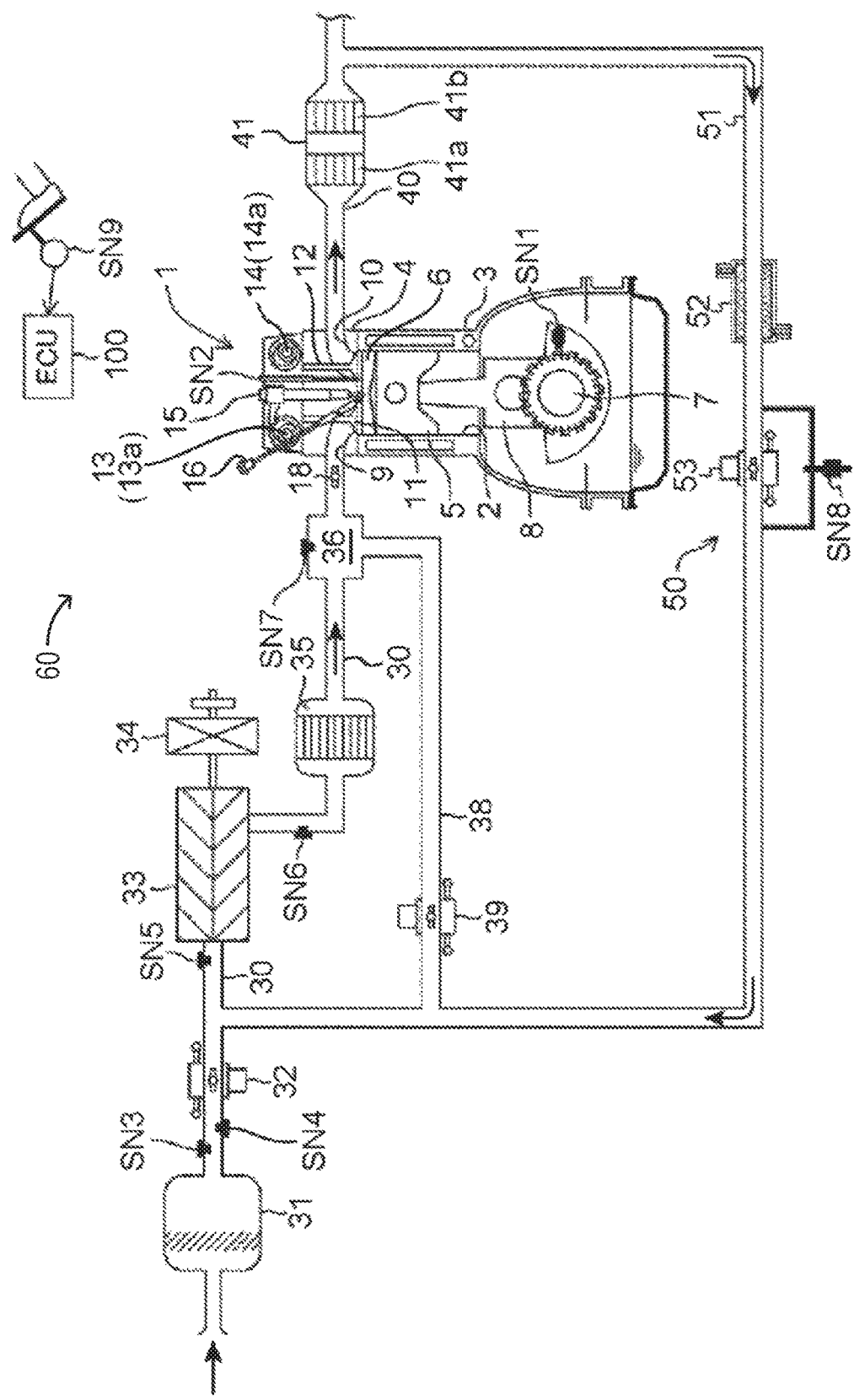
FIG. 1 is a system diagram schematically illustrating an overall configuration of a compression-ignition engine according to one embodiment of the present disclosure.
Figure 2:
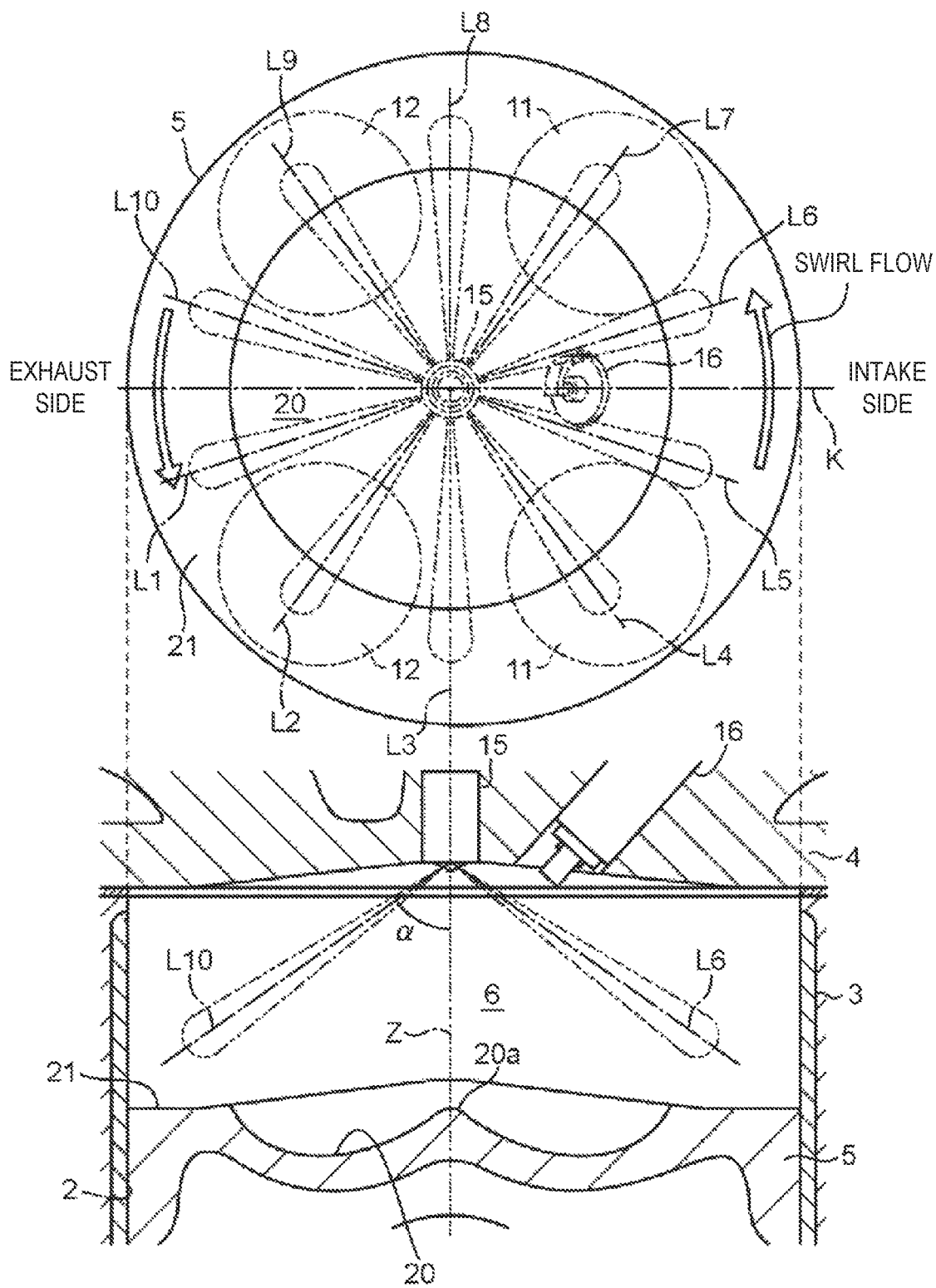
FIG. 2 shows diagrams illustrating a cross-sectional view of a combustion chamber and a plan view of a piston.

FIGS. 1 and 2 are diagrams illustrating a suitable embodiment of a compression-ignition engine (hereinafter, simply referred to as "the engine") to which a control system of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an external exhaust gas recirculation (EGR) device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and an expansion force caused by this combustion pushes down the piston 5 and thus it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set between 13:1 and 30:1, preferably between 14:1 and 18:1, as a suitable value for SPCCI combustion (partial compression-ignition combustion) described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and rotational speed (engine speed) of the crankshaft 7.

The cylinder head 4 is formed with an intake port 9 and an exhaust port 10 which open into the combustion chamber 6, and provided with an intake valve 11 which opens and closes the intake port 9, and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B. The intake valve 11 is provided to each of the first and second intake ports 9A and 9B, and the exhaust valve 12 is provided to each of the first and second exhaust ports 10A and 10B.

Figure 3:
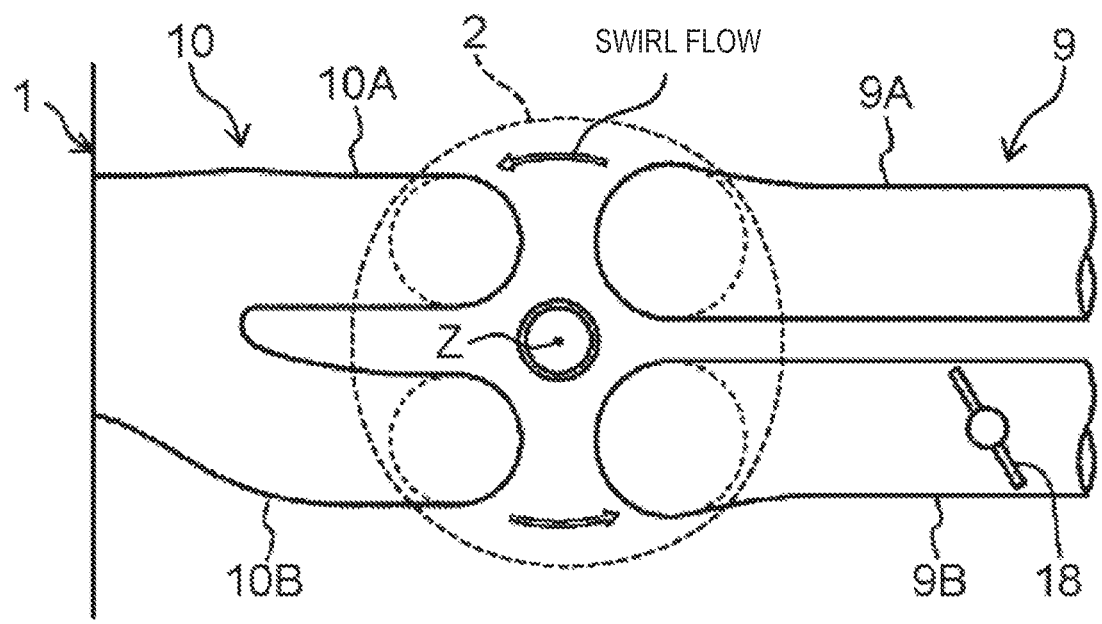
FIG. 3 is a schematic plan view illustrating a structure of a cylinder and intake and exhaust systems in the vicinity thereof.

As illustrated in FIG. 3, a swirl valve 18 configured to open and close the second intake port 9B is provided therein. The swirl valve 18 is only provided to the second intake port 9B and not to the first intake port 9A. When such a swirl valve 18 is driven in the closing direction, since a rate of intake air flowing into the combustion chamber 6 from the first intake port 9A (in which the swirl valve 18 is not provided) increases, a circling flow circling around an axial line Z of the cylinder (a center axis of the combustion chamber 6), that is, the swirl flow, is enhanced. Conversely, driving the swirl valve 18 in the opening direction weakens the swirl flow. Note that the intake port 9 of this embodiment is a tumble port formable of a tumble flow (vertical vortex). Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake variable valve timing mechanism (VVT) 13a configured to change open and close timings of the intake valve 11. Similarly, the valve operating mechanism 14 for the exhaust valve 12 is built therein with an exhaust VVT 14a configured to change open and close timings of the exhaust valve 12. The intake VVT 13a (exhaust VVT 14a) is a so-called variable phase mechanism which simultaneously changes the open and close timings of the intake valve 11 (exhaust valve 12) in the same amount. By controlling the intake VVT 13a and the exhaust VVT 14a, in this embodiment, a valve overlap period in which both the intake and exhaust valves 11 and 12 are opened over TDC of exhaust stroke (ETDC) is adjusted, and by adjusting the valve overlap period, an amount of residual burned gas in the combustion chamber 6 (internal EGR gas) is adjusted.

The cylinder head 4 is provided with the injector 15 which injects the fuel (mainly gasoline) into the combustion chamber 6, and a spark plug 16 which ignites a mixture gas containing the fuel injected into the combustion chamber 6 from the injector 15 and air introduced into the combustion chamber 6. The cylinder head 4 is further provided with an in-cylinder pressure sensor SN2 which detects pressure of the combustion chamber 6 (hereinafter, also referred to as "in-cylinder pressure").

As illustrated in FIG. 2, on a crown surface of the piston 5, a cavity 20 is formed by denting a relatively wide area of the piston 5, including a center part thereof, to the opposite side from the cylinder head 4 (downward). A center section of the cavity 20 is formed with a bulge portion 20a having a substantially conical shape, bulging relatively upward, and both sides of the cavity 20 over the bulge portion 20a in radial directions respectively form a bowl-shaped recessed portion in cross section. In other words, the cavity 20 is a recessed portion having a donut shape in plan view, formed to surround the bulge portion 20a. Further, a section of the crown surface of the piston 5 radially outward of the cavity 20 is a squish portion 21 comprised of an annular flat surface.

The injector 15 is disposed in a center portion of a ceiling surface of the combustion chamber 6, and its tip portion opposes to the center portion (bulge portion 20a) of the crown surface of the piston 5. The injector 15 is a multi-port injector having a plurality of nozzle ports at its tip portion. For example, the injector 15 has a total of ten nozzle ports circumferentially arranged at an even interval, and the ports simultaneously inject the fuel to spread radially (obliquely downwardly). Lines L1 to L10 illustrated in FIG. 2 indicate center lines of the sprays of the fuel injected from the respective nozzle ports. When an angle at which each of the center lines L1 to L10 of the sprays intersects the cylinder axis Z is α, this intersecting angle α is 30-60°, preferably approximately 45°. That is, when the injector 15 injects the fuel, the sprays from the nozzle ports simultaneously spread in directions at angles of 30-60° (preferably 45°) from the cylinder axis Z.

With the total of ten nozzle ports provided in the injector 15 at the even interval as in this embodiment, the center lines L1 to L10 of the sprays are arranged counter-clock wisely, 36° away from each other centering on the cylinder axis Z. When a line extending perpendicular to the intake-exhaust direction of the engine and passing through the cylinder axis Z is a reference line K, the center lines L1 to L5 and the center lines L6 to L10 which are located opposite to each other with respect to the reference line K are in a line symmetric relationship to each other with respect to the reference line K.

The spark plug 16 is located slightly off from the injector 15 to the intake side. The tip portion (electrode portion) of the spark plug 16 is set at a position overlapping with the cavity 20 in the plan view.

As illustrated in FIG. 1, the intake passage 30 is connected to one side surface of the cylinder head 4 to communicate with the intake port 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in order from the upstream side.

An airflow sensor SN3 which detects the flow rate of intake air, first and second intake air temperature sensors SN4 and SN6 which detect a temperature of the intake air, and first and second intake air pressure sensors SN5 and SN7 which detect a pressure of the intake air are provided in various parts of the intake passage 30. The airflow sensor SN3 and the first intake air temperature sensor SN4 are provided in a portion of the intake passage 30 between the air cleaner 31 and the throttle valve 32, and detect the flow rate and the temperature of the intake air passing through this portion. The first intake air pressure sensor SN5 is provided in a portion of the intake passage 30 between the throttle valve 32 and the booster 33 (downstream of a connection port of an EGR passage 51 described later), and detects the pressure of the intake air passing through this portion. The second intake air temperature sensor SN6 is provided in a portion of the intake passage 30 between the booster 33 and the intercooler 35, and detects the temperature of intake air passing through this portion. The second intake air pressure sensor SN7 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lysholm type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33, and boosting by the booster 33 is performed. On the other hand, when the electromagnetic clutch 34 is disengaged, the transmission of the driving force is interrupted, and the boosting by the booster 33 is stopped.

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. The burned gas generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components (HC, CO and $NO_x$) contained within the exhaust gas flowing through the exhaust passage 40, and a GPF (gasoline-particulate filter) 41b which captures particulate matter (PM) contained within the exhaust gas. Note that another catalytic converter built therein with a suitable catalyst, such as a three-way catalyst or a $NO_x$ catalyst, may be added downstream of the catalytic converter 41.

The external EGR device 50 has the EGR passage 51 connecting the exhaust passage 40 to the intake passage 30, and an EGR cooler 52 and an EGR valve 53 which are provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side close to the intake passage 30), and adjusts the flow rate of the exhaust gas flowing through the EGR passage 51. Note that the EGR valve 53 corresponds to one example of an "EGR controller."

The EGR cooler 52 uses cooling water for cooling the engine body 1, as a medium (coolant) for heat exchange. The temperature of the external EGR gas to be recirculated to the intake passage 30 after being cooled by the EGR cooler 52, although significantly drops compared to the temperature of the exhaust gas immediately after being discharged from the combustion chamber 6, exceeds an outdoor temperature. Therefore, while the external EGR is executed, a compression start temperature which is a temperature of the combustion chamber 6 when the compression stroke is substantially started (the intake valve 11 is closed), becomes higher than while the external EGR is not executed.

A pressure difference sensor SN8 which detects a difference between pressure upstream of the EGR valve 53 and pressure downstream thereof is provided in the EGR passage 51.

(2) Control System

Figure 4:
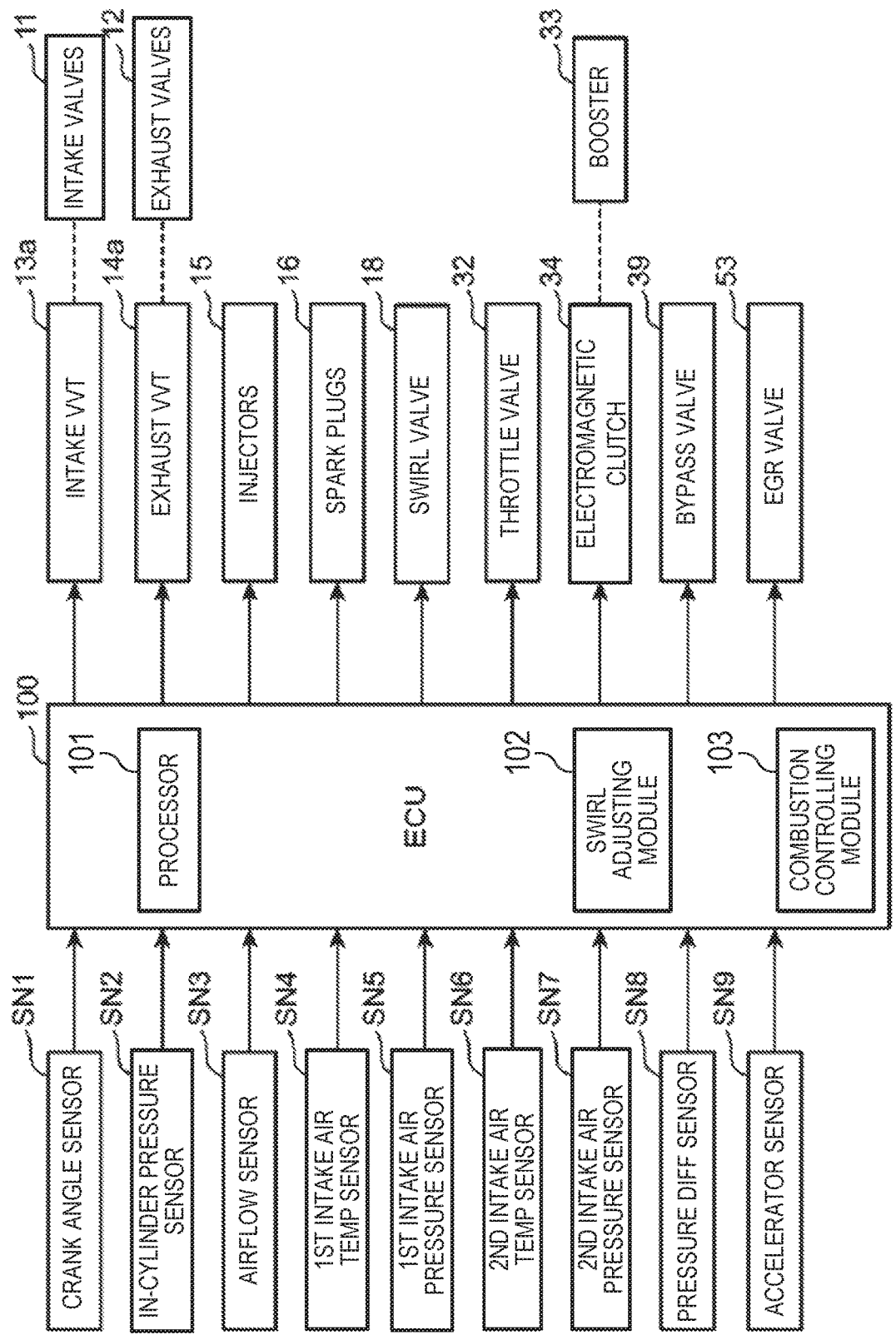
FIG. 4 is a block diagram illustrating a control system of the engine.

FIG. 4 is a block diagram illustrating a control system 60 of the engine. Some components of the engine are not illustrated in FIG. 4. An ECU (electronic control unit) 100 illustrated in FIG. 4 is a microprocessor which comprehensively controls the engine, and comprised of a well-known processor 101 such as a CPU having associated ROM, RAM, etc. The processor 101 is configured to execute a swirl adjusting module 102 to control the swirl valve 18 and a combustion controlling module 103 to output an ignition instruction to the spark plug 16 to ignite at a given ignition timing. These modules are stored in non-transitory memory of the ECU 100 as software.

The ECU 100 receives detection signals from various sensors. For example, the ECU 100 is electrically connected to the crank angle sensor SN1, the in-cylinder pressure sensor SN2, the airflow sensor SN3, the first and second intake air temperature sensors SN4 and SN6, the first and second intake air pressure sensors SN5 and SN7, and the pressure difference sensor SN8, which are described above. The ECU 100 sequentially receives the information detected by these sensors (i.e., the crank angle, the engine speed, the in-cylinder pressure, the intake air flow rate, the intake air temperatures, the intake air pressures, the difference in pressure between the upstream and downstream sides of the EGR valve 53, etc.).

Further, an accelerator sensor SN9 which detects an opening of an accelerator pedal controlled by a vehicle driver driving the vehicle is provided in the vehicle, and a detection signal from the accelerator sensor SN9 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results.

Note that the ECU 100 as described above corresponds to a "controller."

(3) Control According to Operating State

Figure 5:
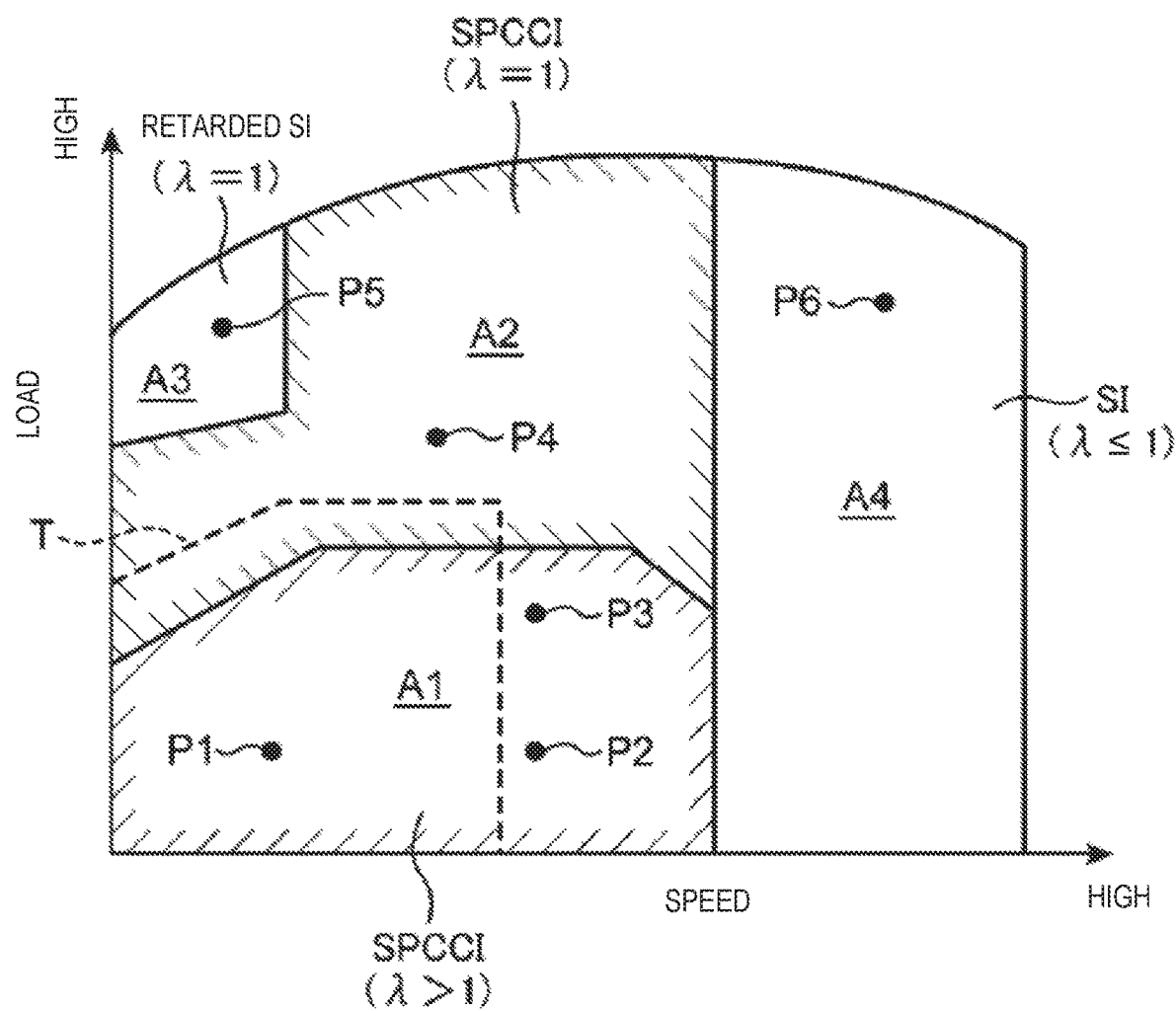
FIG. 5 is a map in which operating ranges of the engine are divided according to a difference in combustion mode.

FIG. 5 is a chart of a map illustrating a difference in control according to an engine speed and load. As illustrated in FIG. 5, an operating range of the engine is roughly divided into four operating ranges A1 to A4 due to the difference in combustion mode. The fourth operating range A4 is a high-speed range in which the engine speed is high. The first operating range A1 is a low and medium-speed, low-load range in which the engine speed is lower than the fourth operating range A4 and the engine load is low. The third operating range A3 is a low-speed high-load range in which the engine speed is low and the engine load is high. The second operating range A2 is a remaining range except for the first, third, and fourth ranges A1, A3, and A4 (i.e., a range combining a low and medium-speed, medium-load range and a medium-speed, high-load range). Hereinafter, the combustion mode, etc. selected in each operating range will be sequentially described.

(3-1) First Operating Range

Within the first operating range A1 in which the engine speed is low and the engine load is low, the partial compression-ignition combustion combining the SI combustion and the CI combustion (hereinafter referred to as "SPCCI combustion") is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark ignition performed in an environment immediately before the mixture gas self-ignites, and after the SI combustion, the CI combustion is performed on the remaining mixture gas in the combustion chamber 6 by self-ignition (by the further increase in temperature and pressure accompanying the SI combustion). Note that "SPCCI" is an abbreviation of "SPark Controlled Compression Ignition."

Figure 6:
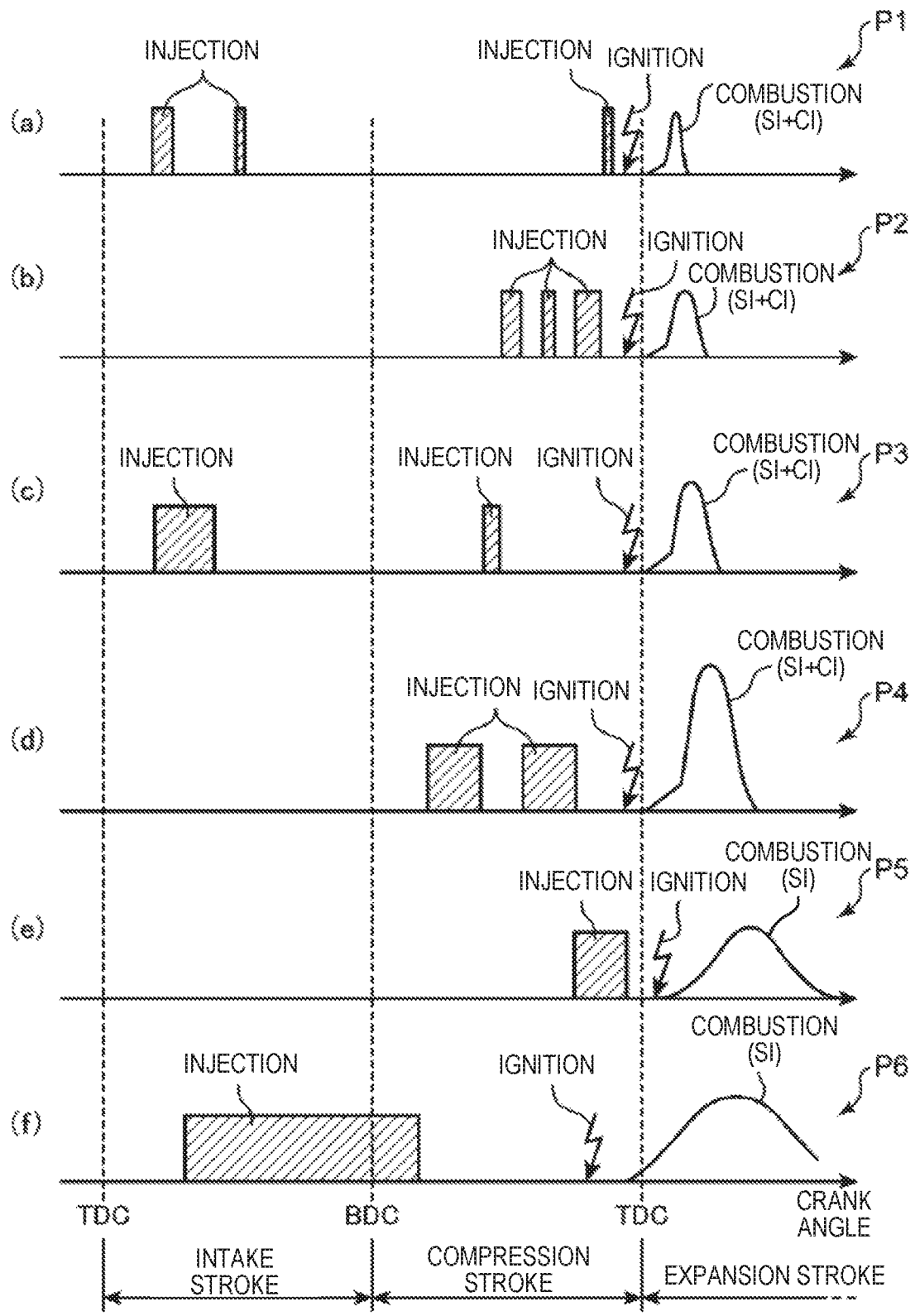
FIG. 6 shows time charts schematically illustrating a combustion control executed in each operating range of the engine.
Figure 7:
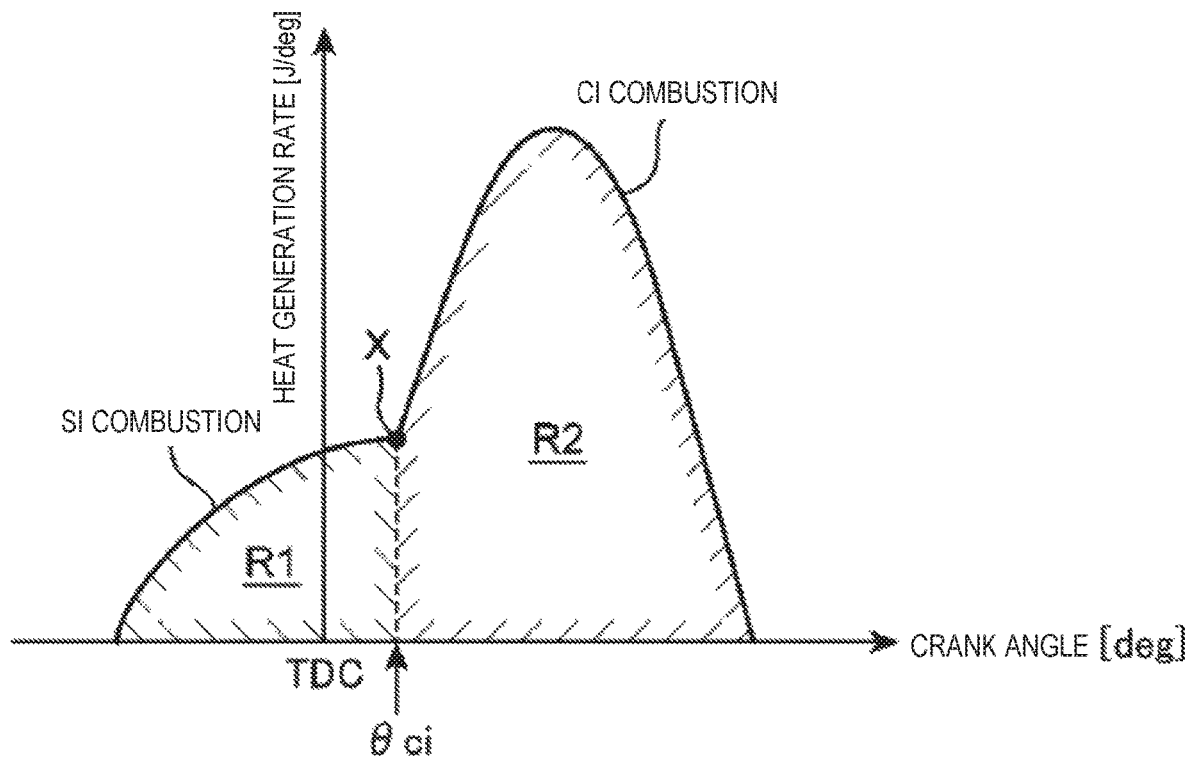
FIG. 7 is a chart illustrating a waveform of a heat generation rate in SPCCI combustion (partial compression-ignition combustion).

The SPCCI combustion has a characteristic that the heat generation in the CI combustion is faster than that in the SI combustion. For example, as illustrated in FIG. 6 or 7 described later, a waveform of a heat generation rate caused by the SPCCI combustion has a shape in which a rising slope in an early stage of the combustion which corresponds to the SI combustion is gentler than a rising slope caused corresponding to the CI combustion occurring subsequently. In other words, the waveform of the heat generation rate caused by the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order. Further, corresponding to the tendency of such a heat generation rate, in the SPCCI combustion, a pressure increase rate ($dp/d\theta$) inside the combustion chamber 6 caused by the SI combustion is lower than that in the CI combustion.

When the temperature and pressure inside the combustion chamber 6 rise due to the SI combustion, the unburned mixture gas self-ignites and the CI combustion starts. As illustrated in FIG. 6 or 7 described later, the slope of the waveform of the heat generation rate changes from gentle to sharp at the timing of self-ignition (that is, the timing when the CI combustion starts). That is, the waveform of the heat generation rate caused by the SPCCI combustion has a flection point at a timing when the CI combustion starts (indicated by an "X" in FIG. 7).

After the CI combustion starts, the SI combustion and the CI combustion are performed in parallel. In the CI combustion, since the combustion speed of the mixture gas is faster than that in the SI combustion, the heat generation rate becomes relatively high. However, since the CI combustion is performed after TDC of compression stroke (CTDC), the slope of the waveform of the heat generation rate does not become excessive. That is, after CTDC, since the motoring pressure decreases due to the piston 5 descending, the rise of the heat generation rate is prevented, which avoids excessive $dp/d\theta$ in the CI combustion. In the SPCCI combustion, due to the CI combustion being performed after the SI combustion as described above, it is unlikely for dp/dθ which is an index of combustion noise to become excessive, and combustion noise is reduced compared to performing the CI combustion alone (in the case where the CI combustion is performed on all the fuel).

The SPCCI combustion ends as the CI combustion finishes. Since the combustion speed of the CI combustion is faster than that of the SI combustion, the combustion end timing is advanced compared to performing the SI combustion alone (in the case where the SI combustion is performed on all the fuel). In other words, the SPCCI combustion brings the combustion end timing closer to CTDC, on the expansion stroke. Thus, the SPCCI combustion improves the fuel efficiency compared to the SI combustion alone.

As specific modes of the SPCCI combustion, within the first operating range A1, a control for performing the SPCCI combustion of the mixture gas is performed while forming an environment in which an air-fuel ratio (A/F), which is a mass ratio of air (fresh air) to the fuel inside the combustion chamber 6, is larger than a stoichiometric air-fuel ratio (14.7:1) (hereinafter, referred to as A/F lean environment). In order to achieve such the SPCCI combustion under the A/F lean environment, within the first operating range A1, the various components of the engine are controlled by the ECU 100 as follows.

The injector 15 injects the fuel in a plurality of split injections from the intake stroke to the compression stroke. For example, at an operation point P1 where the engine speed and load are relatively low within the first operating range A1, as illustrated in Part (a) of FIG. 6, the injector 15 injects a major portion of the fuel to be injected in one cycle in two split injections from an early stage to an intermediate stage of the intake stroke, and the remaining fuel is injected in a final stage of the compression stroke (a total of three injections). Further, at an operation point P2 where the engine speed is higher than and the engine load is the same as the operation point P1, as illustrated in Part (b) of FIG. 6, the injector 15 injects the fuel in three split injections from the intermediate stage to the final stage of the compression stroke. Further, at an operation point P3 where the engine speed and load are higher than the operation point P1, as illustrated in Part (c) of FIG. 6, the injector 15 injects a major portion of the fuel to be injected in the one cycle mainly in the early stage of the intake stroke and the remaining fuel in the intermediate stage of the compression stroke (a total of two injections).

The spark plug 16 ignites the mixture gas near CTDC. For example, at the operation points P1 to P3, the spark plug 16 ignites the mixture gas at a slightly advanced timing from CTDC. That is, after forcibly combusting a portion of the mixture gas through flame propagation caused by spark ignition (SI combustion), the remaining mixture gas is combusted by self-ignition (CI combustion).

The booster 33 is controlled to be OFF inside a boost line T illustrated in FIG. 5, and be ON outside the boost line T. Inside the boost line T where the booster 33 is OFF, i.e., at the lower speed side of the first operating range A1, the electromagnetic clutch 34 is disengaged to disconnect the booster 33 from the engine body 1 and the bypass valve 39 is fully opened so as to stop boosting by the booster 33. Outside the boost line T where the booster 33 is ON, i.e., at the higher speed side of the first operating range A1, the electromagnetic clutch 34 is engaged to connect the booster 33 to the engine body 1 so as to perform boosting by the booster 33. Here, the opening of the bypass valve 39 is controlled so that the pressure in the surge tank 36 (boosting pressure) detected by the second intake air pressure sensor SN7 matches given target pressure determined for each operating condition (engine speed and engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boosting pressure, becomes low. By adjusting the backflow amount of the intake air in this manner, the bypass valve 39 controls the boosting pressure to the target pressure.

The intake VVT 13a and the exhaust VVT 14a set valve operation timings of the intake and exhaust valves 11 and 12 so that the valve overlap period in which both the intake and exhaust valves 11 and 12 are opened over ETDC is formed (see FIG. 11 described later). As a result, the internal EGR which leaves the burned gas inside the combustion chamber 6 is achieved, and the temperature of the combustion chamber 6 is increased. That is, by opening the exhaust valve 12 until after ETDC (until the early stage of the intake stroke), the burned gas is drawn back into the combustion chamber 6 from the exhaust port 10 and the internal EGR is achieved. The valve overlap period (more specifically, the period in which the exhaust valve 12 is opened on the intake stroke) is adjusted so that an internal EGR ratio which is a ratio of the internal EGR gas introduced into the combustion chamber 6 increases as the engine load is reduced. The details of this adjustment will be described later in Section (4-2).

The EGR valve 53 is opened in a major segment of the first operating range A1. Specifically, the EGR valve 53 is opened in the major segment of the first operating range A1 which is other than its low speed section (segments b2, b3, and b4 illustrated in FIG. 8 described later), and the opening of the EGR valve 53 in this opened segment is larger as the engine speed is higher. Thus, an external EGR ratio which is a ratio of exhaust gas recirculated to the combustion chamber 6 through the EGR passage 51 (external EGR gas) is adjusted to increase as the engine speed increases. The details of this adjustment will be described later in Section (4-1).

The throttle valve 32 is fully opened. Thus, a relatively large amount of air (fresh air) is introduced into the combustion chamber 6 and A/F is set larger than the stoichiometric air-fuel ratio. In other words, within the first operating range A1, the SPCCI combustion is performed in the A/F lean environment in which an excess air ratio $\lambda$ which is a value obtained by dividing an actual air-fuel ratio by the stoichiometric air-fuel ratio is larger than 1. For example, the excess air ratio $\lambda$ within the first operating range A1 is set to 2 or above so that an amount of $NO_x$ generated by the combustion is sufficiently reduced. Note that in this embodiment, while the internal EGR and the external EGR are executed within the first operating range A1 as described above, the amount of EGR gas introduced into the combustion chamber 6 by both the internal and external EGR (the internal EGR gas and the external EGR gas) needs to be set so that an amount of air equivalent to the target air-fuel ratio ($\lambda$>2) is secured inside the combustion chamber 6. Respective target values of the internal EGR ratio and the external EGR ratio within the first operating range A1 are determined in advance to fulfill these requirements. That is, in this embodiment, the target values of the internal EGR ratio and the external EGR ratio are set so that an amount of gas obtained by subtracting an air amount equivalent to the target air-fuel ratio ($\lambda$>2) from the total gas amount introduced into the combustion chamber 6 in the state where the throttle valve 32 is fully opened is introduced into the combustion chamber 6 as the internal EGR gas and the external EGR gas. Further, the valve overlap period and the opening of the EGR valve 53 are respectively adjusted according to the target values of the EGR ratios.

The opening of the swirl valve 18 is set smaller than a half-opened state (50%). By reducing the opening of the swirl valve 18, a major portion of the intake air introduced into the combustion chamber 6 is sucked in from the first intake port 9A (the intake port to which the swirl valve 18 is not provided), and a strong swirl flow is formed inside the combustion chamber 6. This swirl flow grows on the intake stroke, remains until an intermediate section of the compression stroke, and stimulates stratification of the fuel. That is, a concentration difference that the fuel concentration is higher in the center portion of the combustion chamber 6 than outside thereof (outer circumferential portion) is formed. Although described in detail in Section (5-2) later, by such effect of the swirl flow, within the first operating range A1, the air-fuel ratio in the center portion of the combustion chamber 6 is set to between 20:1 and 30:1 and the air-fuel ratio in an outer circumferential portion of the combustion chamber 6 is set to 35:1 or above. Further, the opening of the swirl valve 18 is reduced to be smaller as the engine speed is lower. Thus, the intensity of the swirl flow is adjusted to be higher as the engine speed is lower.

(3-2) Second Operating Range

Within the second operating range A2 (a range combined the low and medium-speed, medium-load range and the medium-speed, high-load range), a control for performing the SPCCI combustion of the mixture gas is performed while forming an environment in which a gas air-fuel ratio (G/F), which is a ratio of all the gas to the fuel inside the combustion chamber 6, is larger than the stoichiometric air-fuel ratio (14.7:1) and A/F substantially matches the stoichiometric air-fuel ratio (hereinafter, referred to as G/F lean environment), is executed. For example, in order to achieve the SPCCI combustion in such a G/F lean environment, within the second operating range A2, various components of the engine are controlled by the ECU 100 as follows.

The injector 15 injects at least a portion of the fuel to be injected in one combustion cycle, during the compression stroke. For example, at an operation point P4 within the second operating range A2, the injector 15 injects the fuel separately in two times in an early half and latter half of the compression stroke, as illustrated in Part (d) of FIG. 6.

The spark plug 16 ignites the mixture gas near CTDC. For example, at the operation point P4, the spark plug 16 ignites the mixture gas at a slightly advanced timing from CTDC. This ignition triggers the SPCCI combustion, and a portion of the mixture gas inside the combustion chamber 6 is combusted through flame propagation caused by spark ignition (SI combustion), then the remaining mixture gas is combusted by self-ignition (CI combustion).

The booster 33 is controlled to be OFF in a section of the low-load and low-speed range overlapping with the section inside the boost line T, and be ON outside this section. When the booster 33 is ON and boosting the intake air, the opening of the bypass valve 39 is controlled so that the pressure inside the surge tank 36 (boosting pressure) matches with the target pressure.

The intake VVT 13a and the exhaust VVT 14a set the valve operation timings of the intake and exhaust valves 11 and 12 so that the valve overlap period of a given length is formed. Note that since the boosting is performed (i.e., the intake air pressure is increased) within substantially the entire second operating range A2, even when the exhaust valve 12 is opened on the intake stroke, the backflow of the burned gas into the combustion chamber 6 from the exhaust port 10 (i.e., internal EGR) does not easily occur. Thus, the internal EGR ratio within the second operating range A2 is smaller than that within the first operating range A1, and the internal EGR is substantially stopped particularly in the higher load side of the second operating range A2.

The throttle valve 32 is fully opened.

The opening of the EGR valve 53 is controlled so that the air-fuel ratio (A/F) in the combustion chamber 6 becomes the stoichiometric air-fuel ratio ($\lambda=1$) or therearound. For example, the EGR valve 53 adjusts the amount of the exhaust gas recirculated through the EGR passage 51 (external EGR gas) so that the excess air ratio $\lambda$, becomes 1±0.2. Note that since the air amount equivalent to the stoichiometric air-fuel ratio increases as the engine load increases, accordingly the external EGR ratio within the second operating range A2 is set to be smaller as the engine load increases (in other words, it is set to be larger as the engine load is reduced). The opening of the EGR valve 53 is controlled according to the target value of the external EGR ratio set in this manner.

The opening of the swirl valve 18 is set substantially the same as within the first operating range A1 or a given intermediate opening larger than this opening.

(3-3) Third Operating Range

Within the third operating range A3 on the low-speed, high-load side, a control is executed in which at least a portion of the fuel is injected in the final stage of the compression stroke and the mixture gas is subjected to the SI combustion. For example, in order to achieve the SI combustion accompanied by such a retarded injection, within the third operating range A3, the various components of the engine are controlled by the ECU 100 as follows.

The injector 15 injects at least a portion of the fuel to be injected in one combustion cycle in the final stage of the compression stroke. For example, at an operation point P5 included in the third operating range A3, as illustrated in Part (e) of FIG. 6, the injector 15 injects all the fuel to be injected in one cycle in the final stage of the compression stroke (immediately before CTDC).

The spark plug 16 ignites the mixture gas at a relatively retarded timing, for example 5° CA to 20° CA from CTDC. Further, this ignition triggers the SI combustion, and all the mixture gas in the combustion chamber 6 combusts through flame propagation. Note that the reason why the ignition timing within the third operating range A3 is retarded as described above is to prevent abnormal combustion, such as knocking and pre-ignition. However, within the third operating range A3, the fuel injection is set to be performed in the final stage of the compression stroke (immediately before CTDC), which is considerably late, therefore, even with the ignition timing retarded as described above, the combustion speed after the ignition (flame propagation speed) is relatively fast. That is, since the period from the fuel injection to the ignition is sufficiently short, the flow (turbulence kinetic energy) in the combustion chamber 6 at the ignition timing becomes relatively strong, and the combustion speed after the ignition is accelerated using this flow. Thus, thermal efficiency is kept high while preventing abnormal combustion.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio ($\lambda=1$) or thereabout. For example, the EGR valve 53 adjusts the amount of the exhaust gas recirculated through the EGR passage 51 (external EGR gas) so that the excess air ratio $\lambda$ becomes $1\pm0.2$.

The opening of the swirl valve 18 is set to or near a half-opened state (50%).

(3-4) Fourth Operating Range

Within the fourth opening range A4 on the higher speed side of the first to third operating ranges A1 to A3, relatively basic SI combustion is executed. In order to achieve this SI combustion, within the fourth operating range A4, the various components of the engine are controlled by the ECU 100 as follows.

The injector 15 at least injects the fuel over a given period overlapping with the intake stroke. For example, at an operation point P6 within the fourth operating range A4, the injector 15 injects the fuel over a continuous period from the intake stroke to the compression stroke, as illustrated in Part (f) of FIG. 6. Note that since the operation point P6 corresponds to a considerably high-speed and high-load condition, the amount of fuel to be injected in one combustion cycle is large and also a crank angle period required for injecting the required amount of fuel becomes long, for which the fuel injection period at the operation point P6 is longer than the other operation points (P1 to P5) described above.

The spark plug 16 ignites the mixture gas near CTDC. For example, at the operation point P6, the spark plug 16 ignites the mixture gas at a slightly advanced timing from CTDC. Further, this ignition triggers the SI combustion, and all the mixture gas in the combustion chamber 6 combusts through flame propagation.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio or slightly richer ($\lambda \le 1$).

The swirl valve 18 is fully opened. Thus, not only the first intake port 9A but also the second intake port 9B are fully opened and charging efficiency of the engine is improved.

(4) EGR Ratio Setting

Next, the external EGR and the internal EGR performed within the first operating range A1 of FIG. 5 described above (the executing range of the SPCCI combustion in the A/F lean environment) will be described in detail.

(4-1) External EGR Ratio

Figure 8:
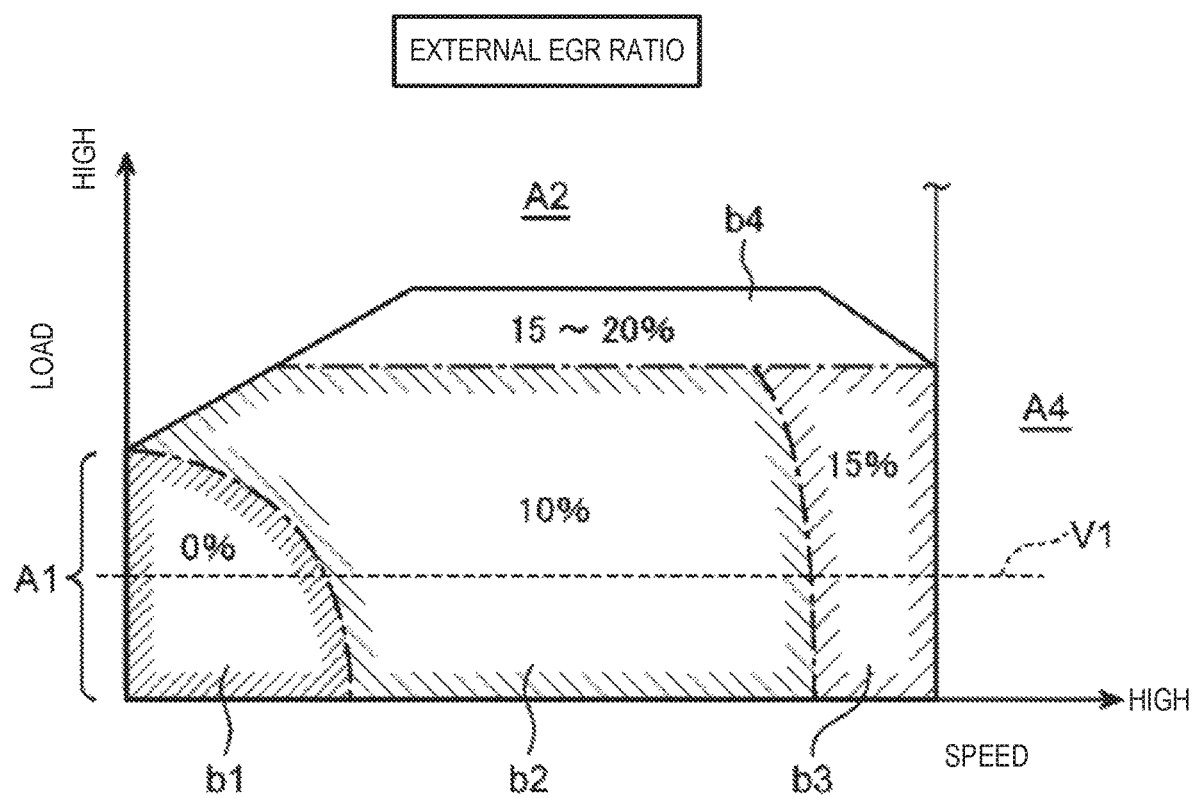
FIG. 8 is a map illustrating a specific example of a target external EGR ratio set within a first operating range of the engine.
Figure 9:
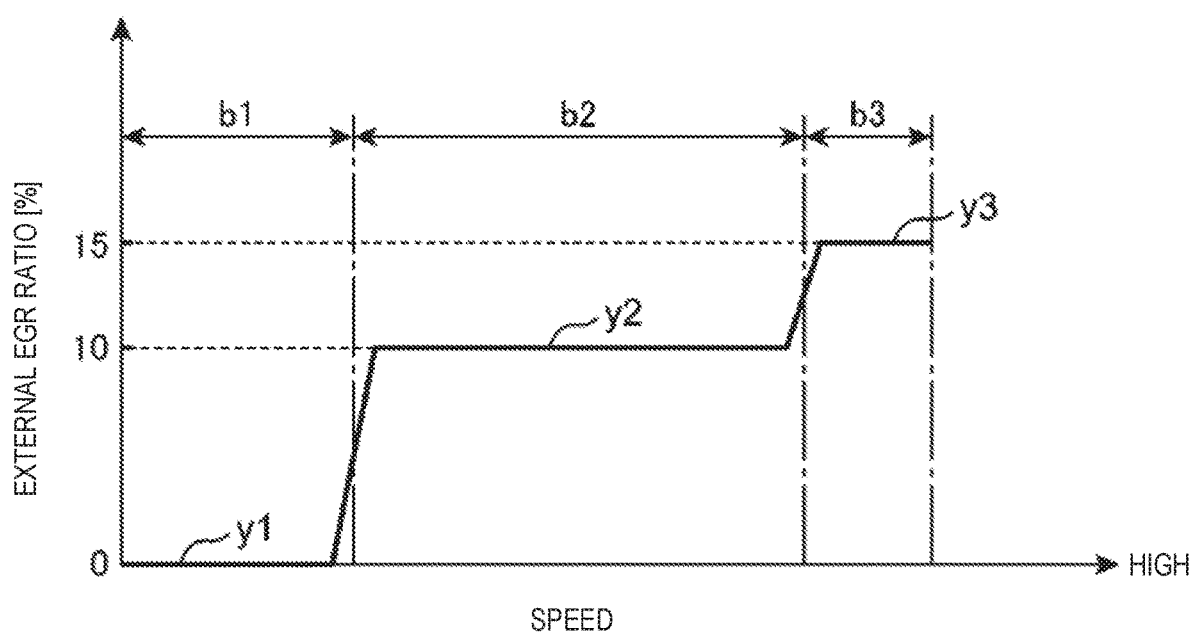
FIG. 9 is a chart illustrating a change in the target external EGR ratio when an engine speed is changed while an engine load is fixed.

FIG. 8 is a map illustrating a specific example of a target value of the external EGR ratio set within the first operating range A1 (hereinafter, may be referred to as "target external EGR ratio"), and FIG. 9 is a chart illustrating a change in the target external EGR ratio when the engine speed is changed while the engine load is fixed (along a line V1 of FIG. 8). As illustrated in FIGS. 8 and 9, within the first operating range A1, the target external EGR ratio is set to increase substantially between 0 and 20% as the engine speed or load is increased. Note that the external EGR ratio used here is a mass ratio of exhaust gas recirculated to the combustion chamber 6 through the EGR passage 51 (external EGR gas) to all the gas inside the combustion chamber 6.

For example, the target external EGR ratio is set to take different values among respective four segments b1 to b4 set within the first operating range A1. When the segments are the first segment b1, the second segment b2, the third segment b3, and the fourth segment b4, the first segment b1 corresponds to a lowest-speed, lowest-load segment, the second segment b2 corresponds to a segment where the engine speed or load is higher than the first segment b1, the third segment b3 is a segment where mainly the engine speed is higher than the second segment b2, and the fourth segment b4 corresponds to a segment where the engine load is higher than the second and third segments b2 and b3. The target external EGR ratio is set to 0% in the first segment b1, 10% in the second segment b2, 15% in the third segment b3, and 15 to 20% in the fourth segment b4.

More specifically, in the first to third segments b1 to b3, as illustrated in FIG. 9, a fixed target external EGR ratio (one of 0%, 10%, and 15%) is set except for a boundary between the segments. That is, when the target external EGR ratio within the first segment b1 is a first target value y1, the target external EGR ratio within the second segment b2 is a second target value y2, and the target external EGR ratio within the third segment b3 is a third target value y3, the first target value y1 is uniformly set to 0% except for a highest engine speed part of the first segment b1, the second target value y2 is uniformly set to 10% except for a highest engine speed part and a lowest engine speed part of the second segment b2, and the third target value y3 is uniformly set to 15% except for a lowest engine speed part of the third segment b3. Therefore, when, for example, the engine speed increases through the first, second and third segments b1, b2, and b3 in this order (along the line V1 of FIG. 8), the target external EGR ratio increases to 0%, 10% and 15% respectively in a substantially stepwise fashion. Note that the first segment b1 corresponds to a "first speed range," the second segment b2 corresponds to a "second speed range," and the third segment b3 corresponds to a "third speed range."

Note that in the fourth segment b4, different from the first to third segments b1 to b3, the target external EGR ratio is variably set between 15 and 20%. For example, the target external EGR ratio is set to approach 20% as the engine load increases, and approach 15% as the engine load is reduced within the fourth segment b4.

During the operation within the first operating range A1, the ECU 100 adjusts the opening of the EGR valve 53 so that the external EGR gas of the amount corresponding to the target external EGR ratio set as above is recirculated into the combustion chamber 6 through the EGR passage 51.

(4-2) Internal EGR Ratio

Figure 10:
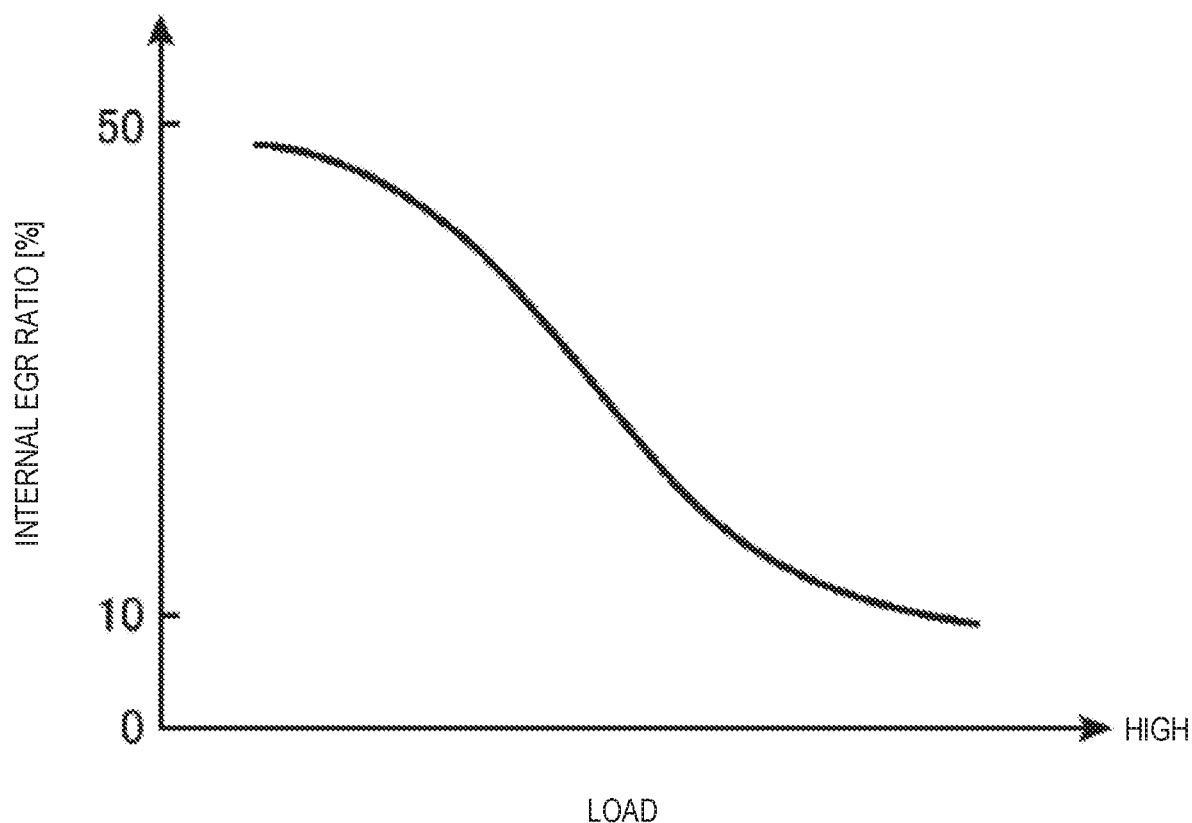
FIG. 10 is a chart illustrating a specific example of a target internal EGR ratio set within the first operating range.

FIG. 10 is a chart illustrating a specific example of the target value of the internal EGR ratio set within the first operating range A1 (hereinafter, may be referred to as "target internal EGR ratio"). As illustrated in FIG. 10, the target internal EGR ratio within the first operating range A1 is variably set according to the engine load (not particularly dependent of the engine speed). For example, the target internal EGR ratio is set to increase substantially between 10 and 50% as the engine load is reduced. Note that the internal EGR ratio used here is a mass ratio of residual burned gas inside the combustion chamber 6 (internal EGR gas) to all the gas inside the combustion chamber 6. Further, the concept of the residual burned gas inside the combustion chamber 6 includes, not only the burned gas residing inside the combustion chamber 6 without being discharged to the exhaust port 10, but also the burned gas returned into the combustion chamber 6 from the exhaust port 10 by opening the exhaust valve 12 on the intake stroke.

Figure 11:
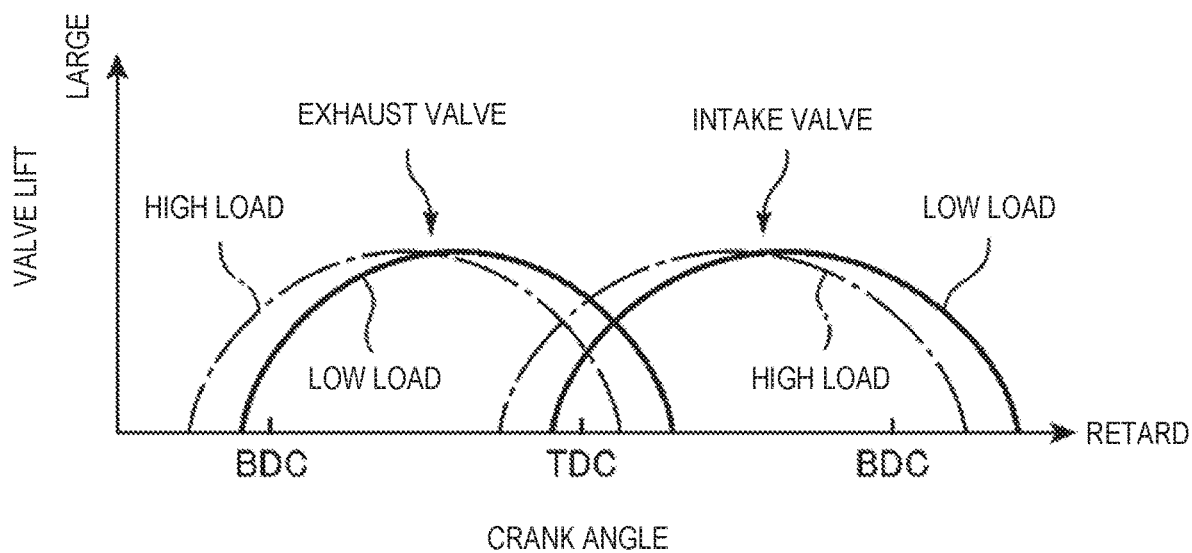
FIG. 11 is a chart illustrating open and close timings (lift curves) of intake and exhaust valves set within the first operating range.
Figure 12:
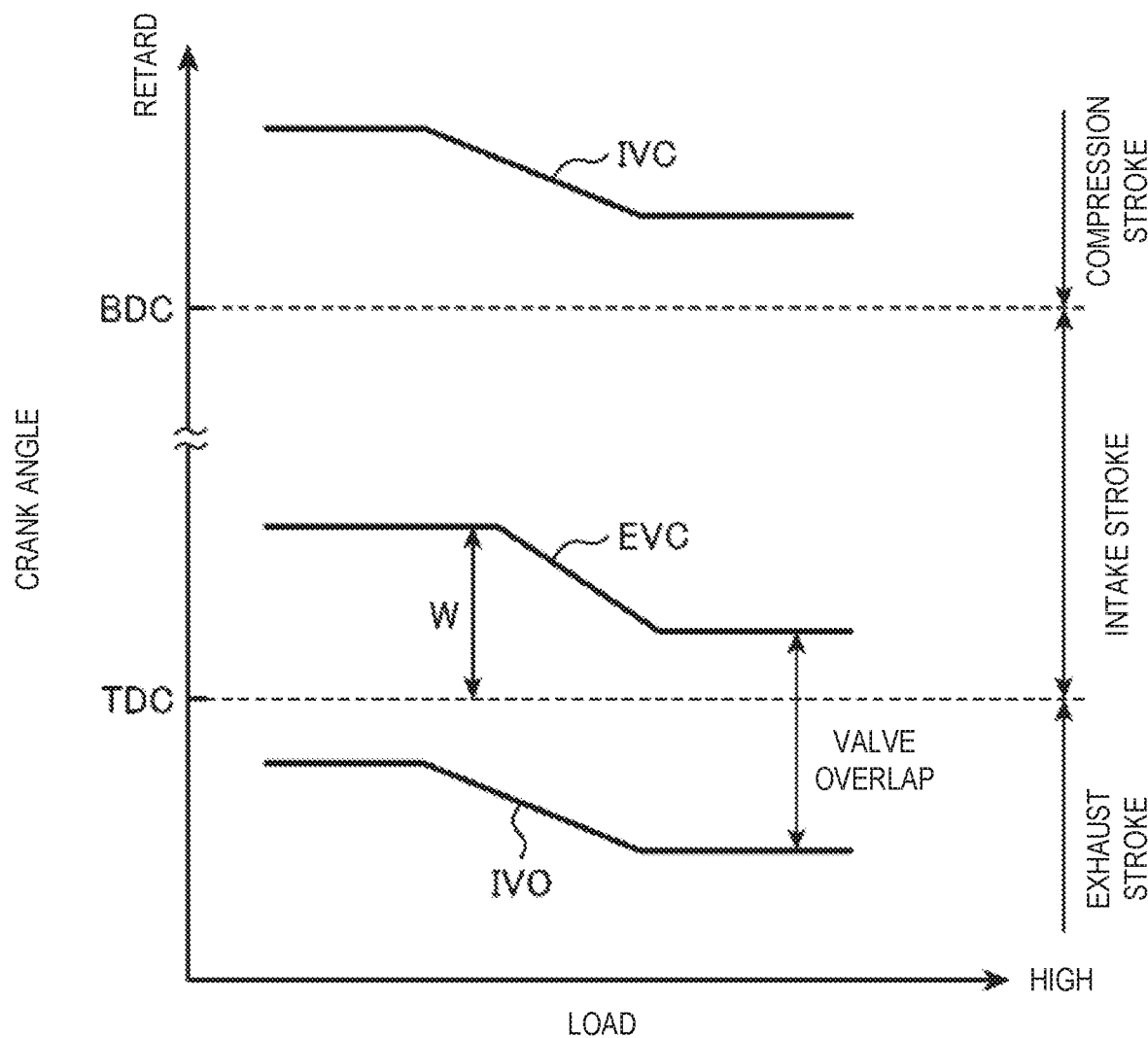
FIG. 12 is a chart illustrating a change in the close timing of the exhaust valve (EVC) and the open timing of the intake valve (IVO) according to the engine load.

FIGS. 11 and 12 are views illustrating open and close timings of the intake and exhaust valves 11 and 12 set by the intake and exhaust VVTs 13*a* and 14*a* during the operation within the first operating range A1. For example, FIG. 11 illustrates lift curves of the intake and exhaust valves 11 and 12 when the engine load is low/high within the first operating range A1. FIG. 12 illustrates a close timing of the exhaust valve 12 (EVC), an open timing of the intake valve 11 (IVO), and a close timing of the intake valve 11 (IVC) when the engine load is changed within the first operating range A1. As illustrated in FIGS. 11 and 12, IVO is set to advance as the engine load increases (to shift away from TDC) on the advancing side of ETDC, EVC is set to advance as the engine load increases (to shift toward TDC) on the retarding side of ETDC, and IVC is set to advance as the engine load increases (to shift toward BDC) on the retarding side of BDC of the intake stroke.

By the above setting of the valve operation timing, the valve overlap period in which both the intake and exhaust valves 11 and 12 open over ETDC at any engine load within the first operating range A1 is formed. When a part of the valve overlap period indicated by a reference character W in FIG. 12, i.e., a period in which the exhaust valve 12 is opened after ETDC (during the intake stroke), is the exhaust opened state extending period, this period W is set shorter as the engine load increases. Thus, the amount of burned gas returned from the exhaust port 10 and resided inside the combustion chamber 6 decreases as the engine load increases.

During the operation within the first operating range A1, the ECU 100 controls the intake and exhaust VVTs 13a and 14a according to the valve operation timings set as above. Thus, the amount of the residual burned gas inside the combustion chamber 6 (internal EGR gas) decreases as the engine load increases, and the internal EGR ratio changes along the target value illustrated in FIG. 10 (decreases as the engine load increases).

(5) Swirl Control

Next, a swirl control within the first operating range A1 will be described in detail.

(5-1) Opening Setting of Swirl Valve

Figure 13:
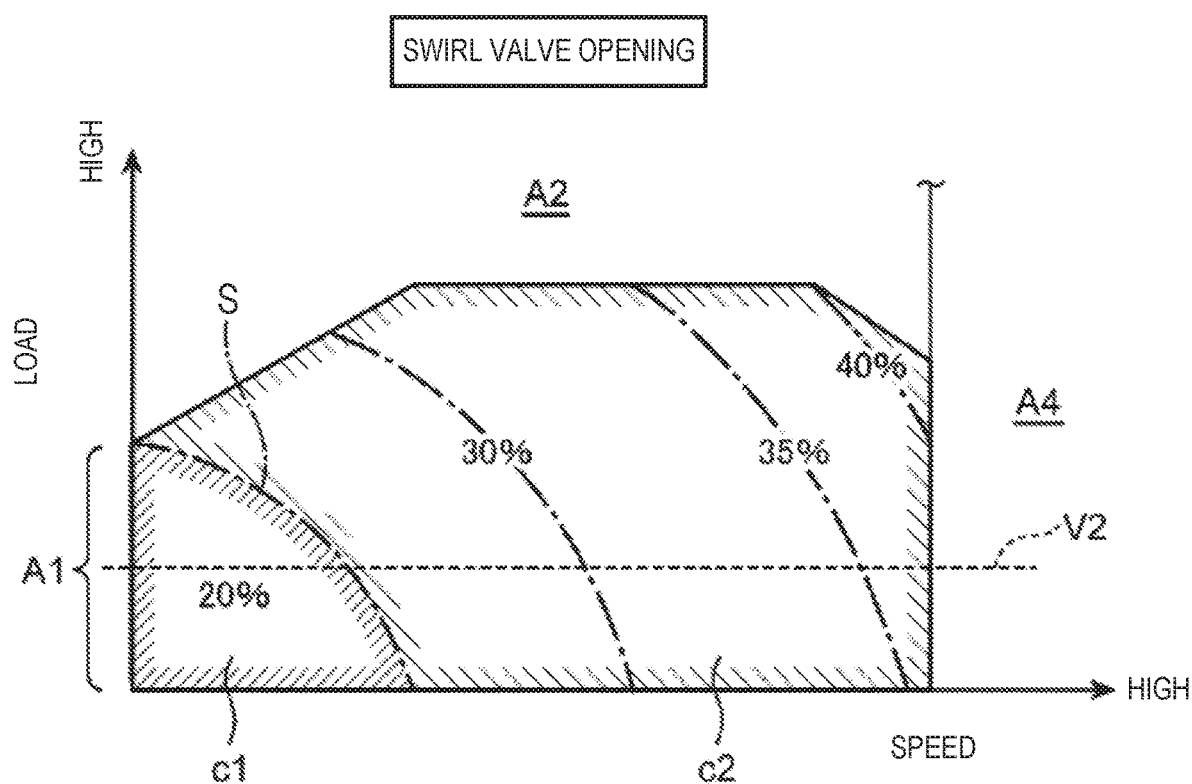
FIG. 13 is a map illustrating a specific example of a target swirl valve opening set within the first operating range.
Figure 14:
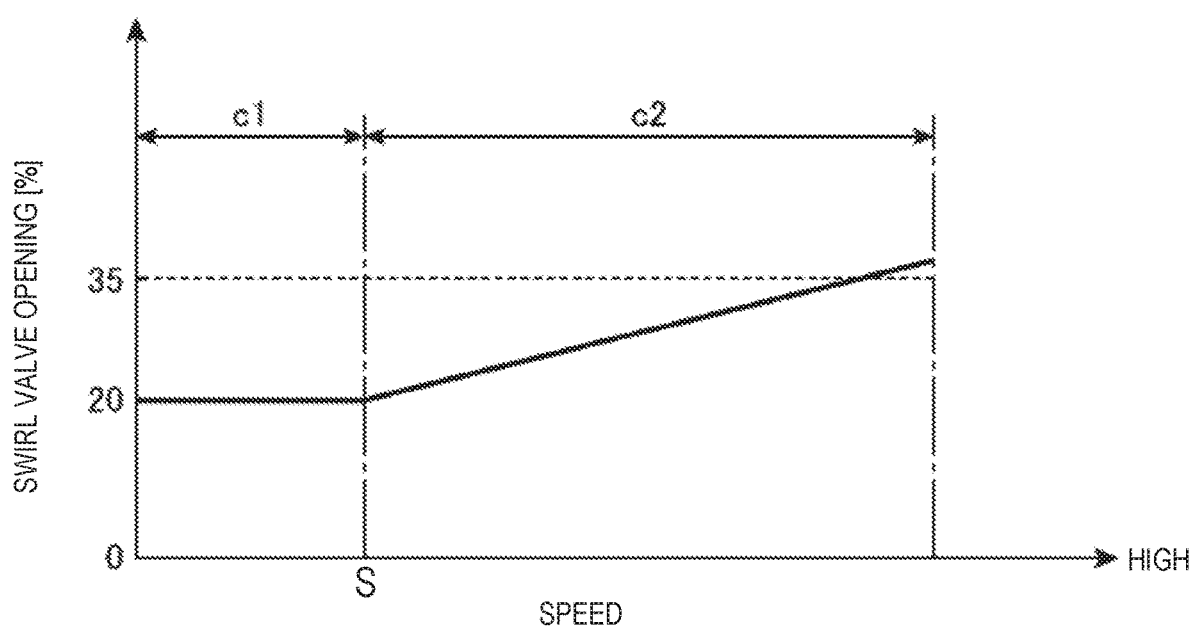
FIG. 14 is a chart illustrating a change in the target swirl valve opening when the engine speed is changed while the engine load is fixed.

FIG. 13 is a map illustrating a specific example of a target value of the opening of the swirl valve 18 set within the first operating range A1 (hereinafter, may be referred to as "target swirl valve opening"). FIG. 14 is a chart illustrating a change in the target swirl valve opening when the engine speed is changed while the engine load is fixed (along a line V2 of FIG. 13). As illustrated in FIGS. 13 and 14, within the first operating range A1, the target external EGR ratio is set to increase substantially between 20 and 40% as the engine speed or load is increased.

For example, the target swirl valve opening is uniformly set to 20% within a base segment c1 which is a lowest-speed, lowest-load segment within the first operating range A1, and is set to gradually increase as the engine speed or load increases within a main segment c2 where the engine speed or load is higher than the base segment c1. In the main segment c2, the target swirl valve opening approaches 20% as the engine speed and load are reduced closer to the base segment c1, and is increased from 20% to approximately 40% at most as the engine speed and load increase to move away from the base segment c1. For example, when the engine speed increases to cross the base segment c1 and the main segment c2 in this order (along the line V2 of FIG. 13), as illustrated in FIG. 14, the target swirl valve opening is kept at 20% while the engine speed is within the base segment c1, and after shifting to the main segment c2, it is increased substantially at a fixed rate as the engine speed increases.

In other words, in this embodiment, the change rate of the opening of the swirl valve 18 with respect to the engine speed (and thus a change rate of the intensity of the swirl flow) is set to decrease as the engine speed decreases. More specifically, the opening of the swirl valve 18 is set to change at a different rate from a boundary speed S between the basic segment c1 and the main segment c2, and the change rate of the opening of the swirl valve 18 in a speed range lower than the boundary speed S is made smaller than that in a speed range higher than this speed S. Particularly in this embodiment, the change rate of the opening of the swirl valve 18 in the speed range lower than the boundary speed S is set to zero, and as a result, the opening of the swirl valve 18 in the same speed range is kept at a constant value (20%).

During the operation in the first operating range A1, the ECU 100 controls the opening of the swirl valve 18 according to the engine speed and load in accordance with the target swirl valve opening set as described above.

(5-2) Effect of Swirl Flow

The opening control of the swirl valve 18 as described above is performed in order to control the distribution of the mixture gas inside the combustion chamber 6 (adjust the fuel concentration difference) by using the swirl flow. That is, since the swirl flow swirling around the cylinder axis Z brings a relatively large amount of fuel to the center portion of the combustion chamber 6, by suitably adjusting the intensity of the swirl flow and the fuel injection timing, a desired fuel concentration difference in the radial directions of the combustion chamber 6 can be generated. Hereinafter, the above-described effect of the swirl flow will be described in detail while showing the behavior of fuel (spray) when the fuel is injected on the intake stroke in a state where a sufficiently strong swirl flow is formed.

Figure 15:
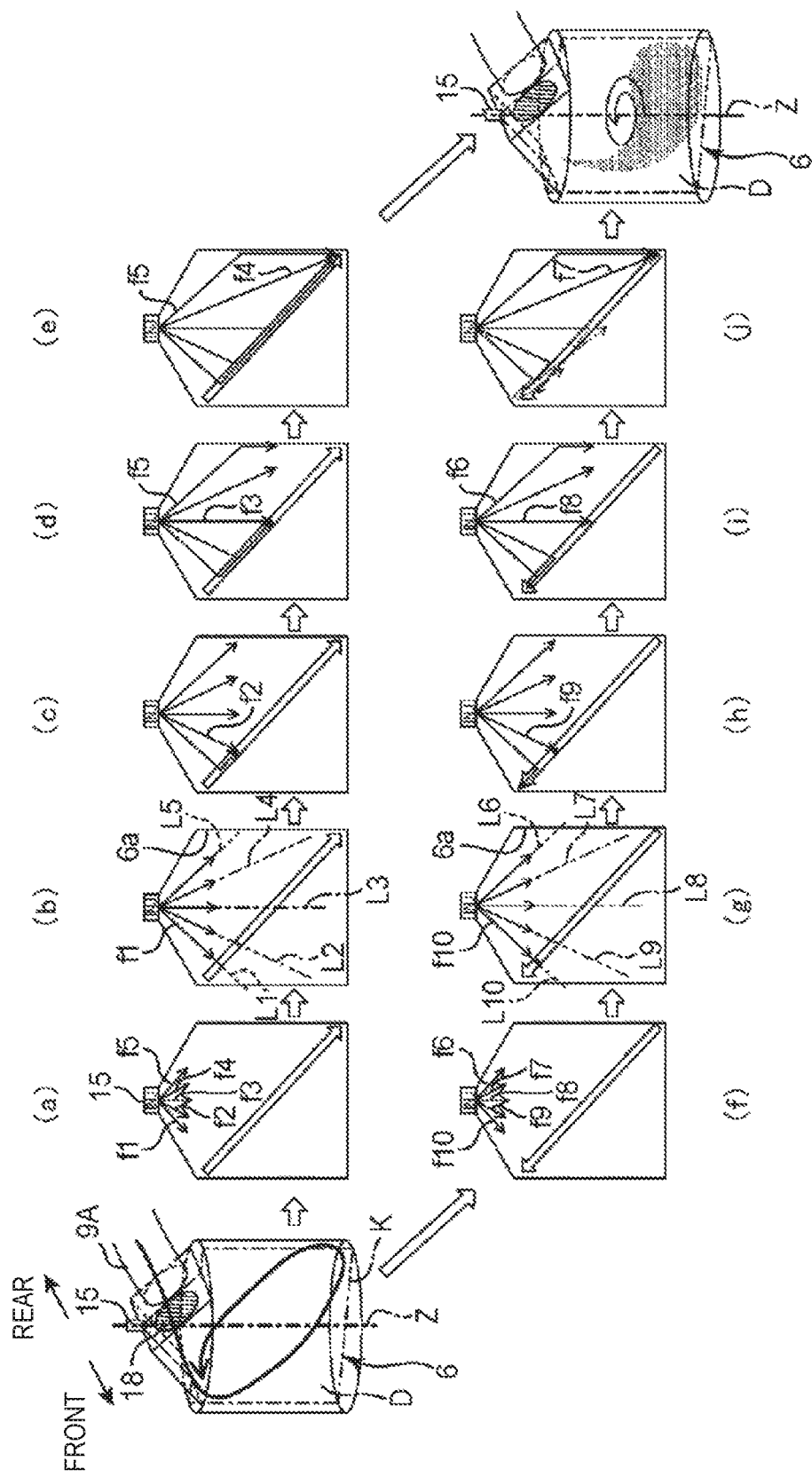
FIG. 15 shows diagrams illustrating a behavior of fuel (spray of fuel portions) injected by an injector, in relation to a swirl flow.

FIG. 15 shows diagrams illustrating the behavior of fuel (spray) injected by the injector 15, in relation to the swirl flow. The perspective view at the left end of FIG. 15 schematically shows a state of the combustion chamber 6 at a given timing on the intake stroke at which the volume of the combustion chamber 6 is relatively large. In FIG. 15, the swirl valve 18 is substantially closed. In this case, air is introduced into the combustion chamber 6 mainly from the first intake port 9A, and a strong swirl flow (lateral vortex) swirling around the cylinder axis Z is formed as indicated by an arrow in FIG. 15. This swirl flow is, as described before, an inclined swirl flow mixed with the tumble flow (vertical vortex).

Here, in a direction perpendicular to the intake and exhaust directions, the side of the combustion chamber 6 at which the swirl valve 18 is provided (the second intake port 9B side) is a front side, the side where the swirl valve 18 is not provided (the first intake port 9A side) is a rear side. The swirl flow formed by closing the swirl valve 18 (that is, the inclined swirl flow) flows upwardly at the exhaust side of the combustion chamber 6 from the first intake port 9A, then passes a front section of the combustion chamber 6 obliquely downwardly while swirling in a large circle, and reaches a lower section at the intake side of the combustion chamber 6. Further, the swirl flow passes through a rear section of the combustion chamber 6 obliquely upwardly while swirling in a large circle, and returns to the upper section at the exhaust side of the combustion chamber 6.

A reference character D in the perspective view at the left end of FIG. 15 indicates a virtual plane bisecting an internal space of the combustion chamber 6 in the front and rear directions of the engine (directions perpendicular to the intake and exhaust directions), and each of the schematic views (a) to (j) located on the right side of the perspective view indicates states of the front and rear sides of the combustion chamber 6 divided by the virtual plane D. For example, the five parts (a) to (e) in the upper part of FIG. 15 illustrate in a chronological order an influence of an upstream portion of the swirl flow flowing at the front side of the combustion chamber 6 on each spray of the fuel. Further, the five parts (f) to (j) in the lower part of FIG. 15 illustrate in a chronological order an influence of a downstream portion of the swirl flow flowing at the rear side of the combustion chamber 6 on each spray of the fuel.

The outlined arrows in Parts (a) to (j) of FIG. 15 show a main stream of the inclined swirl flow generated inside the combustion chamber 6 (a center portion of the flow with strong stream, hereinafter may simply be referred to as "the swirl flow"). Note that the main stream of the swirl flow has therearound a weak side stream flowing in the same direction as the main stream. Although the flow of the fuel spray may be influenced by the side stream, since the current direction of the side stream is the same as the main stream and also the main stream is more intense, even when the fuel spray is influenced by the side stream, the main stream has a dominant influence finally. Therefore, a later-described phenomenon in which the mixture gas distribution is formed by the swirl flow rarely changes due to the side stream.

First, the behavior of fuel injected to the front side of the combustion chamber 6 will be described. Part (a) of FIG. 15 illustrates the front side of the combustion chamber 6 immediately after the fuel is injected from the injector 15. Although this fuel injection simultaneously forms a spray of five fuel portions f1 to f5 at the front side of the combustion chamber 6, none of the spray has reached the swirl flow at this point. Note that in FIG. 15, the spray of the fuel portions f1 to f5 is illustrated as arrows along the center lines L1 to L5 of the respective fuel portions (see Part (b) of FIG. 15 and FIG. 2). Similarly, the spray of the fuel portions f6 to f10 described later is also illustrated as arrows along the center lines L6 to L10 of the respective fuel portions (see Part (g) of FIG. 15 and FIG. 2).

As illustrated in the Part (b) of FIG. 15, among all the fuel portions f1 to f5 at the front side, the fuel portion f1 injected from the nozzle port closest (having the shortest reach distance) to the swirl flow reaches the swirl flow first. Next, as illustrated in Part (c) of FIG. 15, the fuel portion f2 injected from the nozzle port having the second shortest reach distance reaches the swirl flow. The fuel portion f2 reaches the swirl flow on the downstream side of the position at which the fuel portion f1 precedingly reaches the swirl flow. On the other hand, the fuel portion f1 moves downstream together with the swirl flow. Therefore, when the fuel portion f2 reaches the swirl flow, it joins with the fuel portion f1 moving together with the swirl flow.

As illustrated Part (d) of FIG. 15, the fuel portion f3 injected from the nozzle port having the third shortest reach distance reaches the swirl flow on the downstream side of the position at which the fuel portion f2 reaches the swirl flow. Here, the fuel portion f3 joins with the fuel portions f1 and f2 that were already joined to flow together with the swirl flow.

Next, as illustrated in Part (e) of FIG. 15, the fuel portion f4 injected from the nozzle port having the fourth shortest reach distance reaches the swirl flow. In this example, the fuel portion f4 reaches the swirl flow in a lower end section of the combustion chamber 6. Here, the fuel portion f4 joins with the fuel portions f1, f2, and f3 that were already joined to flow together with the swirl flow.

Further, as illustrated in Part (d) of FIG. 15, the fuel portion f5 adjacent to the fuel portion f4 (closest to the intake side) reaches a wall surface 6a of the combustion chamber 6 first. As illustrated in Parts (d) and (e) of FIG. 15, the fuel portion f5 reached the wall surface 6a reaches the swirl flow by moving downward along the wall surface 6a.

Here, the fuel portion f5 joins with the fuel portions f1, f2, f3, and f4 that were already joined to flow together with the swirl flow.

As described above, in this embodiment, since the plurality of fuel portions (the spray of the fuel portions f1 to f5) are radially injected from the injector 15 to the front side of the combustion chamber 6 where the swirl flow is formed, the fuel portion which reaches the swirl flow first (e.g., the fuel portion f1) moves downstream along the swirl flow and then joins with another fuel portion (e.g., the fuel portion f2) which arrives following the swirl flow. In this embodiment, all the fuel (the fuel portions f1 to f5) injected from the injector 15 to the front side of the combustion chamber 6 join on the swirl flow by this mechanism. This leads to forming a rich mixture gas at a high fuel concentration.

Next, the behavior of the fuel injected to the rear side of the combustion chamber 6 will be described. Part (f) of FIG. 15 in the lower part illustrates a state of the rear side of the combustion chamber 6 immediately after the fuel is injected from the injector 15. Although this fuel injection simultaneously forms a spray of five fuel portions f6 to f10 at the rear side of the combustion chamber 6 (also simultaneously to the spray of the fuel portions f1 to f5 at the front side), none of the spray reaches the swirl flow at this point.

As illustrated in Part (g) of FIG. 15, among all the fuel portions f6 to f10 at the rear side, the fuel portion f10 injected from the nozzle port closest to the swirl flow reaches the swirl flow first. Next, as illustrated in Part (h) of FIG. 15, the fuel portion f9 injected from the nozzle port having the second shortest reach distance reaches the swirl flow. The fuel portion f9 reaches the swirl flow on the upstream side of the position at which the fuel portion f10 precedingly reaches the swirl flow.

When the fuel portion f9 reaches the swirl flow, the fuel portion f10 that previously reached the swirl flow has already moved downstream together with the swirl flow to some extent. That is, the fuel portion f10 moves away from the fuel portion f9 during the time between the arrival of the fuel portion f10 at the swirl flow and the arrival of the fuel portion f9 at the swirl flow thereafter, and does not join with the fuel portion f9. After the fuel portion f9 reaches the swirl flow, the fuel portion f9 moves downstream together with the swirl flow, while the fuel portion f10 moves even further downstream. Therefore, in either case the fuel portion f9 does not join with the fuel portion f10. In this manner, the fuel portions f9 and f10 move along the swirl flow while staying separated from each other.

Next, as illustrated in Part (i) of FIG. 15, the fuel portion f8 injected from the nozzle port at the third shortest reach distance reaches the swirl flow on the upstream side of the position at which the fuel portion f9 reaches the swirl flow. Here, since the fuel portions f9 and f10 which precedingly reach the swirl flow move downstream together with the swirl flow, these fuel portions f9 and f10 do not join with the fuel portion f8.

As described above, in this embodiment, since the plurality of fuel portions (the spray of the fuel portions f8 to f10) are radially injected from the injector 15 to the rear side of the combustion chamber 6 where the swirl flow is formed, the fuel portion which reaches the swirl flow first (e.g., the fuel portion f10) does not join with the fuel portions that reach the swirl flow later (e.g., the fuel portions f8 and f9) which arrive following the swirl flow. In this embodiment, approximately 30% of the fuel injected by the injector 15 diffuses, which leads to forming a homogeneous mixture gas with the fuel spreading widely and thin.

In the fuel injected to the rear side of the combustion chamber 6 (the fuel portions f6 to f10), the fuel other than the fuel portions f8 to f10 separated from each other, that is, the fuel portions f6 and f7, join with the fuel portions f1 to f5 injected to the front side of the combustion chamber 6.

For example, among the fuel portions f6 to f10 at the rear side, the fuel portion f7 injected from the nozzle port at the fourth shortest reach distance reaches the swirl flow in the lower end portion of the combustion chamber 6 as illustrated in Part (j) of FIG. 15. In the lower end portion of the combustion chamber 6, since the fuel portions f1 to f5 at the front side join together by the mechanism described above (see Part (e) of FIG. 15), the fuel portion f7 joins with the fuel portions f1 to f5 which join precedingly.

As illustrated in Part (i) of FIG. 15, the fuel portion f6 adjacent to the fuel portion f7 (closest to the intake side) reaches the wall surface 6a of the combustion chamber 6 first. As illustrated in Parts (i) and (j) of FIG. 15, the fuel portion f6 reached the wall surface 6a reaches the swirl flow by moving downward along the wall surface 6a. Here, the fuel portion f6 joins with the fuel portion f7 and the fuel portions f1 to f5 at the front side. Thus, in this embodiment, approximately 70% of the fuel injected by the injector 15 joins together.

The perspective view at the right end of FIG. 15 schematically illustrates a state of the combustion chamber 6 immediately after all the fuel (the fuel portions f1 to f10) injected from the injector 15 reach the swirl flow. As illustrated in this figure, in this embodiment where a major portion (70%) of the fuel injected from the injector 15 joins together on the swirl flow, the (rich) mixture gas at a sufficiently high fuel concentration is formed along the swirl flow. The rich mixture gas gradually moves toward the center of the combustion chamber 6 while moving circumferentially within the combustion chamber 6 together with the swirl flow.

Figure 16:
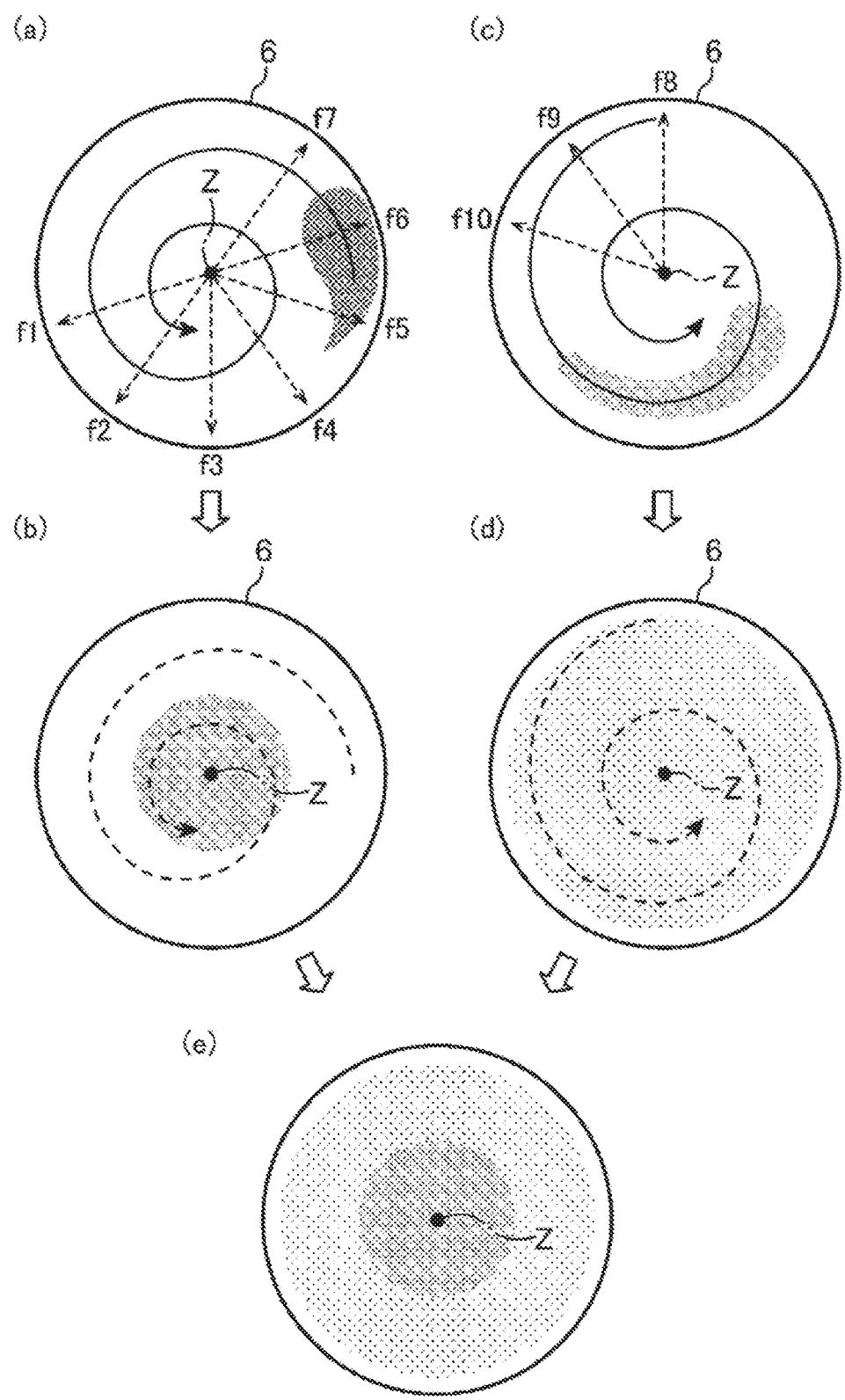
FIG. 16 shows diagrams illustrating a mixture gas moving with the swirl flow within the combustion chamber seen from above.

FIG. 16 shows diagrams illustrating the mixture gas moving with the swirl flow within the combustion chamber 6 seen from above. As illustrated in the figure, the swirl flow formed inside the combustion chamber 6 grows sufficiently as the intake stroke progresses, then attenuates by receiving air resistance, and moves toward the center of the combustion chamber 6 while gradually diffusing.

Part (a) of FIG. 16 illustrates a state where the spray of the fuel portions f1 to f7 joins together to form rich mixture gas (areas with fine dots). As indicated by the arrows in this drawing, this rich mixture gas moves together with the swirl flow which changes as described above, and thus moves toward the center of the combustion chamber 6 while gradually diffusing. As a result, as illustrated in Part (b) of FIG. 16, relatively rich mixture gas is unevenly distributed in the center portion of the combustion chamber 6 immediately before the combustion starts.

Part (c) of FIG. 16 illustrates a state where (lean) mixture gas at a low fuel concentration is formed by the fuel portions f8 to f10 which do not join with each other. As indicated by the arrows in the drawing, this lean mixture gas moves together with the swirl flow to move toward the center of the combustion chamber 6 while sufficiently diffusing. Thus, as illustrated in Part (d) of FIG. 16, immediately before the combustion starts, relatively lean mixture gas spreading in the entire combustion chamber 6 is formed.

Part (e) of FIG. 16 illustrates a state where the mixture gas illustrated in Parts (b) and (d) are superimposed. As illustrated in this figure, the mixture gas formed by the fuel portions f1 to f7 joined together (Part (b) of FIG. 16), is mixed with the mixture gas formed by the diffusing fuel portions f8 to f10 (Part (d) of FIG. 16), and thus a stratified mixture gas in which the fuel concentration is higher in the center portion than in the outer circumferential portion is formed in the combustion chamber 6. That is, the rich mixture gas with relatively high fuel concentration is formed in the center portion of the combustion chamber 6 and the lean mixture gas with relatively low fuel concentration is formed in the outer circumferential portion of the combustion chamber 6.

With the effect of the swirl flow as described above, even when the fuel is injected at a relatively early timing of the intake stroke, the mixture gas at the timing of spark ignition (at the start of the SPCCI combustion) is stratified to some extent, which means that relatively rich mixture gas is formed in the center portion of the combustion chamber 6. Such stratification of the mixture gas becomes more obvious as the swirl flow is enhanced.

For example, at the operation point P1 of the first operating range A1, the major portion of the fuel is injected on the intake stroke as described above (see Part (a) of FIG. 6). However, at a point at which the engine speed and load are sufficiently low as at the operation point P1, since the swirl valve 18 is set to have the lowest opening (20%) and a sufficiently strong swirl flow is formed as illustrated in FIG. 13, even when the major portion of the fuel is injected on the intake stroke as described above, the fuel distribution is not made even and the fuel concentration in the center portion of the combustion chamber 6 becomes higher than in the outer circumferential portion. Moreover, at the operation point P1, since additional fuel is injected in the final stage of the compression stroke, this injected fuel is added to the center portion of the combustion chamber 6, resulting in more obvious stratification of the mixture gas. As a result, at the operation point P1, sufficiently stratified mixture gas is formed in which A/F is between 20:1 and 30:1 in the center portion and 35:1 or larger in the outer circumferential portion. Such stratification of the mixture gas acts advantageously on the growth of the flame after the spark ignition. That is, while the spark ignition by the spark plug 16 acts on the mixture gas in the center portion of the combustion chamber 6 to form a flame core, since the A/F in the center portion is relatively rich as described above, the growth of the flame core is stimulated and the progression of subsequent combustion is stabilized.

The above phenomenon occurs similarly at the operation point P3 of the first operating range A1. That is, also at the operation point P3, while the major portion of the fuel is injected on the intake stroke (see Part (c) in FIG. 6), a large amount thereof is brought to the center portion of the combustion chamber 6 by the swirl flow, and the fuel concentration in the center portion increases. However, as it can be understood from FIG. 13, at the operation point P3, the opening of the swirl valve 18 is reduced smaller than at the operation point P1, and as a result, the swirl flow is made relatively weak. However, at the operation point P3 where the engine load is higher than at the operation point P1, since the total fuel injection amount is relatively large, even when the swirl flow is weakened as described above (even when the fuel concentration difference between the outer circumferential portion and the center portion slightly decreases), the relatively rich mixture gas advantageous in forming the flame core (A/F=20:1 to 30:1) is formed in the center portion of the combustion chamber 6 without any problem.

On the other hand, at the operation point P2, since all the fuel is injected on the compression stroke (see Part (b) in FIG. 6), even if there is no swirl flow, the fuel concentration in the center portion of the combustion chamber 6 tends to become high. With a combination of this and the effect of the swirl flow remaining until the compression stroke, the stratification of the mixture gas becomes more obvious at the operation point P2. Thus, despite the most severe condition for ignitability due to the high engine speed and the low engine load, sufficient ignitability is secured.

(6) About SI Ratio

As described above, in this embodiment the SPCCI combustion combined the SI combustion and the CI combustion is performed within the first and second operating ranges A1 and A2. In this SPCCI combustion, it is important to control the ratio of the SI combustion with the CI combustion according to the operating condition.

In this embodiment, as this ratio, an SI ratio which is a ratio of a heat generation amount by the SI combustion to the total heat generation amount by the SPCCI combustion (the SI combustion and the CI combustion) is used. FIG. 7 is a chart illustrating this SI ratio and illustrating a change in heat generation rate (J/deg) according to the crank angle when the SPCCI combustion occurs. The flection point X in the waveform of FIG. 7 is a flection point appearing when the combustion mode switches from the SI combustion to the CI combustion and the crank angle θci corresponding to this flection point X may be defined as the start timing of CI combustion. Further, an area R1 of the waveform of the heat generation rate located on the advance side of this θci (the start timing of CI combustion) is set as the heat generation amount by the SI combustion, and an area R2 of the waveform of the heat generation rate located on the retarding side of θci is the heat generation rate by the CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

In the case of CI combustion, since the mixture gas combusts a plurality of times simultaneously by self-ignition, the heat generation rate easily increases compared to the SI combustion which is caused by flame propagation, and loud noise easily occurs. Therefore, as a whole, the SI ratio (=R1/(R1+R2)) in the SPCCI combustion is desirably increased as the engine load increases. This is because, when the load is high, the fuel injection amount is larger and the total heat generation amount in the combustion chamber 6 is larger compared to when the load is low, and therefore, loud noise is generated if the SI ratio is reduced (that is, the proportion of CI combustion is increased). Conversely, the CI combustion is excellent in terms of thermal efficiency. Therefore, it is preferable to apply the CI combustion to the largest fuel amount possible unless the noise becomes an issue. Therefore, as a whole, the SI ratio in the SPCCI combustion is desirably reduced as the engine load is reduced (i.e., the proportion of the CI combustion is increased). In view of these points, in this embodiment, the SI ratio aimed for (target SI ratio) is determined in advance so that the SI ratio increases as the engine load becomes higher (in other words, the SI ratio decreases as the engine load becomes lower). Accordingly, in this embodiment, a target θci which is a start timing of the CI combustion when the combustion conforming to this target SI ratio is performed is also determined in advance for each operating condition of the engine.

In order to achieve the target SI ratio and the target θci, the control amounts, such as the ignition timing, the fuel injection amount and timing, and the EGR ratio (the external EGR ratio and the internal EGR ratio), need to be adjusted for each operating condition. For example, as the ignition timing is advanced, a larger amount of fuel is combusted in the SI combustion, and the SI ratio increases. Further, as the injection timing of the fuel is advanced, a larger amount of fuel is combusted in the CI combustion, and the SI ratio decreases. Alternatively, as the temperature of the combustion chamber 6 rises according to the increase of the EGR ratio, a larger amount of fuel is combusted in the CI combustion, and the SI ratio decreases. Moreover, since a change in the SI ratio is followed by a change in the θci, changes in these control amounts (the ignition timing, the injection timing, the EGR ratio, etc.) are elements for adjusting the θci.

Based on such a tendency, in this embodiment, the target values of the ignition timing, the fuel injection amount and timing, the external EGR ratio, the valve operation timings (and thus the internal EGR ratio), etc. are determined in advance for each operating condition so as to achieve a value combination achievable of the target SI ratio and the target θci described above. In the operation with the SPCCI combustion (i.e., in the operation within the first and second operating ranges A1 and A2), the ECU 100 controls the injector 15, the spark plug 16, the EGR valve 53, the intake and exhaust VVTs 13a and 14a, etc. based on the target values of these control amounts. For example, the spark plug 16 is controlled based on the target value of the ignition timing and the injector 15 is controlled based on the target values of the fuel injection amount and timing. Further, the EGR valve 53 and the intake and exhaust VVTs 13a and 14a are controlled based on the respective target values of the external EGR ratio in the combustion chamber 6 and the valve operation timings (internal EGR ratio), and the recirculation amount of exhaust gas (external EGR gas) through the EGR passage 51 and the residual amount of burned gas (internal EGR gas) by the internal EGR are adjusted. Note that the target values of the external EGR ratio and the valve operation timings (internal EGR ratio) illustrated in FIGS. 8 to 12 described above are determined from such a viewpoint.

(7) Control Based on Target θci

As described above, in this embodiment, the target values of the control amounts, such as the ignition timing, the fuel injection amount and timing, and the EGR ratio, are determined in advance so that the SI ratio and θci match their respective target values (the target SI ratio and the target θci); however, controlling the control amounts (the ignition timing, etc.) to the target values do not guarantee to achieve the target SI ratio and the target θci. Therefore, in this embodiment, the start timing of the CI combustion, θci, is identified for each combustion cycle and the ignition timing is adjusted based on the identified θci.

Figure 17:
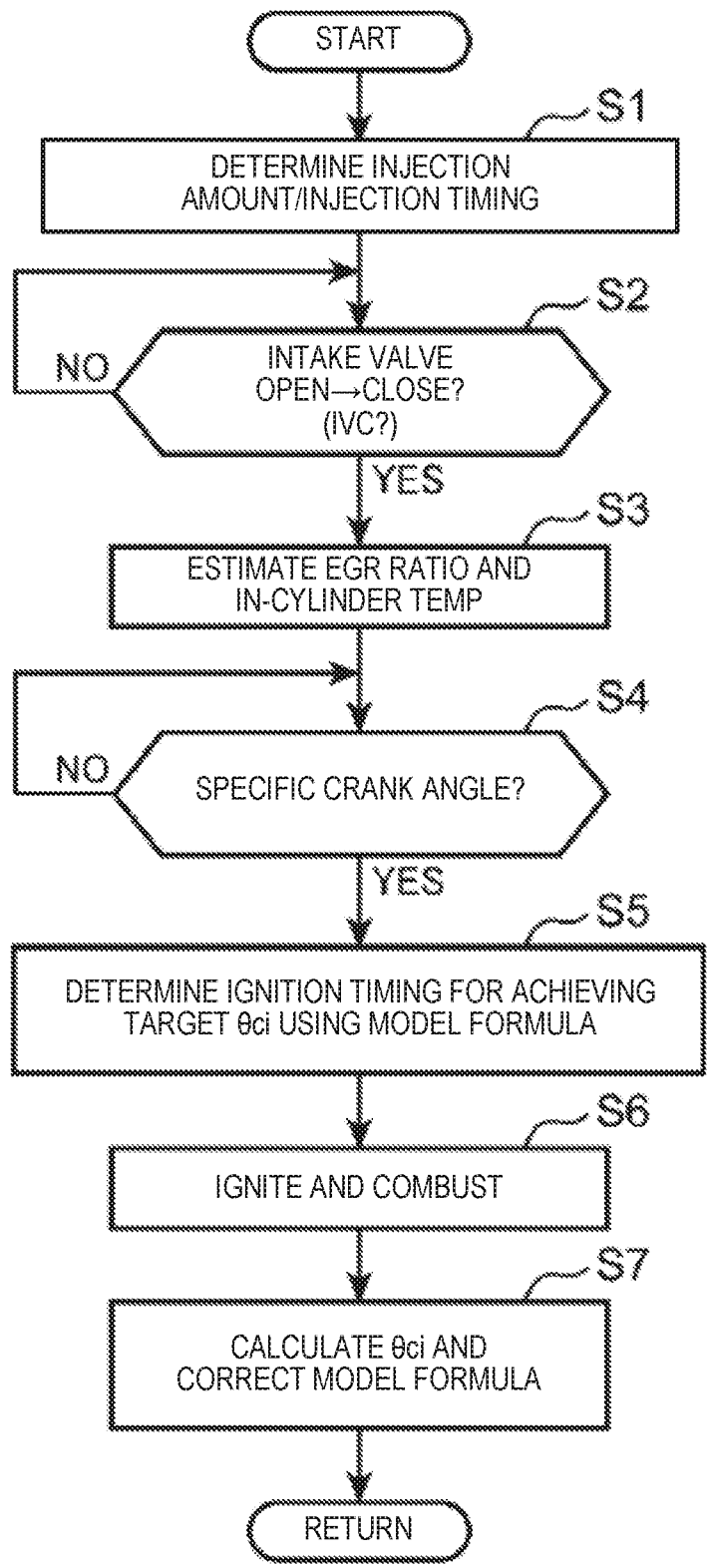
FIG. 17 is a flowchart illustrating details of a control executed during SPCCI combustion.

FIG. 17 is a flowchart illustrating details of the control executed by the ECU 100 in the SPCCI combustion, that is, in the operation within the first and second operating ranges A1 and A2 illustrated in FIG. 5. When the control illustrated in this flowchart starts, at S1, the ECU 100 determines the fuel injection amount from the injector 15 and its injection timing based on the engine speed detected by the crank angle sensor SN1 and the engine load identified by the detection value of the accelerator sensor SN9 (accelerator opening), the detection value of the airflow sensor SN3 (intake flow rate), etc. Note that the injection amount and timing of the fuel determined here are the injection amount and timing defined in advance for each operating condition of the engine so that the target θci is achieved.

Next, the ECU 100 shifts to S2 to determine whether the intake valve 11 is closed (switched from "open" to "closed"). In this embodiment, since the valve operation timing is determined in advance for each engine operating condition, IVC is also known in advance for each operating condition. The ECU 100 determines whether IVC determined for each operating condition has passed based on the detection value of the crank angle sensor SN1, and determines that the intake valve 11 is closed when determined that IVC has passed.

If S2 is YES and it is confirmed that the intake valve 11 is closed, the ECU 100 shifts to S3 to estimate the EGR ratio and the in-cylinder temperature (the internal temperature of the combustion chamber 6). For example, the ECU 100 estimates the EGR ratio (the external EGR ratio and the internal EGR ratio) based on various parameters including the in-cylinder pressure detected by the in-cylinder pressure sensor SN2 when the intake valve 11 is closed (that is, IVC), the flow rate of the intake air (fresh air) detected by the air flow sensor SN3 before IVC, and the pressure difference between upstream and downstream of the EGR valve 53 detected by the pressure difference sensor SN8 before IVC. Further, the in-cylinder temperature is estimated based on the estimated EGR ratio and the detection value detected by the second intake temperature sensor SN6.

Note that as described above, in this embodiment, the respective target values of the external EGR ratio and the valve operation timing (internal EGR ratio) are determined in advance (see FIGS. 8 to 12), and the opening of the EGR valve 53 and the intake and exhaust VVTs 13a and 14a are accordingly controlled. However, the actual external EGR ratio and the internal EGR ratio can be thought to vary in different circumstances, and such EGR ratio fluctuation or the accompanying variation in the in-cylinder temperature influence the start timing of the CI combustion ($\theta ci$) and the SI ratio. Therefore, in order to adjust the ignition timing considering such influence, in this embodiment, at S3 the actual EGR ratio and the in-cylinder temperature are estimated for each combustion cycle.

Next, the ECU 100 shifts to S4 to determine whether the current crank angle is a specific crank angle based on the detection value of the crank angle sensor SN1. This specific crank angle is determined in advance as the timing for determining the ignition timing by the spark plug 16, and determined to be a suitable timing from IVC to CTDC (e.g., about 60° CA before CTDC).

If S4 is YES and it is confirmed that the current crank angle is the specific crank angle, the ECU 100 shifts to S5 to determine the ignition timing for achieving the target $\theta ci$.

For example, at S5, the ECU 100 determines the ignition timing for achieving the target $\theta ci$ based on an initial target value of the ignition timing determined corresponding to the target $\theta ci$ (hereinafter, referred to as "default ignition timing") and the estimated values of the EGR ratio and the in-cylinder temperature obtained at S3.

In this embodiment, in order to determine the ignition timing, a model formula is prepared in advance for determining a correction amount of the ignition timing based on the estimated EGR ratio and in-cylinder temperature. For example, the ignition timing needs to be deviated greater from the default ignition timing as the estimated EGR ratio and in-cylinder temperature deviate greater from their target values. On the other hand, in this embodiment, since the initial target values are adopted as they are as the fuel injection amount and timing as described at S1, the deviations in the fuel injection amount and timing from the target values are not required to be taken into consideration. Therefore, in this embodiment, an arithmetic formula having the deviation amounts of the EGR ratio and in-cylinder temperature from the target values as an input element and the correction amount of the ignition timing as an output element is prepared in advance as the model formula. In other words, by inputting the deviation amounts of the EGR ratio and in-cylinder temperature from the target values into the model formula, the correction amount of the ignition timing required to match $\theta ci$ with the target $\theta ci$ (the correction amount from the default ignition timing) is obtained. At S5, a timing retarded or advanced from the default ignition timing by the correction amount calculated based on the model formula is determined as the final ignition timing. Note that when the EGR ratio and in-cylinder temperature estimated at S3 are the same as the target values, the default ignition timing is adopted as the ignition timing as it is.

Next, the ECU 100 shifts to S6 to cause the spark plug 16 to ignite at the ignition timing determined at S5, so as to trigger the SPCCI combustion of the mixture gas.

Next, the ECU 100 shifts to S7 to calculate $\theta ci$ (the start timing of the CI combustion) based on the in-cylinder pressure detected over a given period overlapping with the combustion period of the SPCCI combustion (the period from the start until the end of combustion), and correct the model formula used at S5 based on the calculated $\theta ci$. That is, the ECU 100 calculates a heat generation rate accompanying the combustion for each crank angle based on the waveform of the in-cylinder pressure detected by the in-cylinder pressure sensor SN2 during the given period, and the timing when the SI combustion is switched to the CI combustion (the timing corresponding to the flection point X of FIG. 7) is identified as $\theta ci$ based on the data of the heat generation rate for each crank angle. Further, a deviation amount between this identified $\theta ci$ and the target $\theta ci$ is calculated and, based on this calculated deviation amount, the model formula for determining the ignition timing (the ignition timing for achieving the target $\theta ci$) is corrected. This correction of the model formula leads to an improvement of accuracy in determining the ignition timing next time in a similar condition.

(8) Operations and Effects

As described above, in this embodiment, within the first operating range A1 where the SPCCI combustion is performed under the A/F lean environment, the opening of the swirl valve 18 is reduced as the engine speed is lower and the fuel is injected by the injector 15 toward the swirl flow increased in its intensity accompanying the opening reduction (see FIGS. 13 to 15), which is advantageous in that high combustion stability is secured regardless of the engine speed.

That is, when the engine speed is low, since the flow within the combustion chamber 6 easily reduces, the growth of the flame core easily becomes slow after the spark ignition, which can be considered that it is difficult to secure sufficient flame propagation speed. On the other hand, in this embodiment, since the opening of the swirl valve 18 is reduced at the low speed side of the first operating range A1 and the fuel is injected toward the swirl flow which is increased in its intensity accompanying the opening reduction, by joining the injected fuels at the downstream of the swirl flow, the relatively rich mixture gas is formed in the center portion of the combustion chamber 6. Further by performing the spark ignition by the spark plug 16 on the relatively rich mixture gas, a stable flame core is formed within the mixture gas. In addition, since the subsequent growth of the flame core is stimulated by a strong flow within the combustion chamber 6 due to the swirl flow, the speed of growing the flame core (i.e., the flame propagation speed) is sufficiently secured. Thus, even under a condition where the engine speed is low (thereby, originally, the flow within the combustion chamber 6 easily reduces), the SI combustion progresses stably and the subsequent CI combustion is surely generated, which avoids the start timing of the CI combustion from greatly varying between cycles. As described above, according to this embodiment, regardless of the engine speed being high or low, stable SPCCI combustion is achieved.

In this embodiment, since the opening of the swirl valve 18 is controlled so that the change rate of the opening of the swirl valve 18 in the low engine speed range (base segment c1) in which the engine speed is lower than a given value is less than the change rate in the high engine speed range (main segment c2) than the given value, the swirl flow with the intensity suitable to the engine speed is generated while maintaining fuel efficiency of the engine suitably.

That is, within the main segment c2 where the engine speed is higher than the given value (boundary speed X) in the first operating range A1, since the opening of the swirl valve 18 is reduced as the engine speed decreases, the above described formation of the rich mixture gas and the flow enhancement within the combustion chamber 6 are suitably attained according to the engine speed. On the other hand, within the base segment c1 where the engine speed is lower than the given value in the first operating range A1, if the opening of the swirl valve 18 is changed at the same change rate with the main segment c2, the swirl valve 18 is fully closed (0%) or set to near the fully-closed state, for example, when the engine speed is the lowest, which extremely increases the intensity of the swirl flow. In addition, by excessive flow within the combustion chamber 6 due to the strong swirl flow, the area of the wall surface of the combustion chamber 6 to which the mixture gas during the combustion contacts sharply increases. This causes the sharp increase of cooling loss and results in reducing the fuel efficiency of the engine. In this regard, in this embodiment within the base segment c1 where the engine speed is low, the opening of the swirl valve 18 is maintained at a uniform value (20%) larger than the fully-closed state and the change of the opening according to the speed is prohibited. Thus, even when the engine speed is the lowest value, the intensity of the swirl flow is not increased excessively. In this manner, the sharp increase in the cooling loss is avoided and the fuel efficiency of the engine is suitably maintained.

Further, in this embodiment, since the intensity of the swirl flow is adjusted by opening and closing the swirl valve 18 provided to the second intake port 9B, pumping loss is reduced by expanding the area through which the intake air passes, which accompanies the increase of the opening of the swirl valve 18 at the high speed side of the first operating range A1.

Further in this embodiment, during the operation within the first operating range A1, the control for performing the SPCCI combustion while forming the A/F lean environment in which A/F, which is the mass ratio of air to the fuel inside the combustion chamber 6, is larger than the stoichiometric air-fuel ratio, is executed. Therefore, within the first operating range A1, the SPCCI combustion is performed in an environment in which a heat capacity ratio of the mixture gas is large and which is advantageous for the thermal efficiency, and fuel efficiency of the engine is effectively improved.

That is, when the engine is assumed to be an Otto cycle engine, its theoretical thermal efficiency is determined based only on the compression ratio of the engine and the heat capacity ratio of the mixture gas, and it becomes large when either of the compression ratio and the heat capacity ratio is large. On the other hand, the heat capacity ratio is known to decrease as the number of atoms constituting a gas molecule within the mixture gas increases. For example, triatomic molecules such as $CO_2$ and $H_2O$, which are contained within EGR gas in large amounts, have a smaller heat capacity ratio than diatomic molecules such as $N_2$ and $O_2$, which are mainly contained within air (fresh air). From this, when the A/F lean environment is formed within the first operating range A1 and a larger amount of air than the air amount equivalent to the stoichiometric air-fuel ratio is introduced into the combustion chamber 6, the ratio of the diatomic molecule within the mixture gas may be increased to raise the heat capacity ratio, and thus the thermal efficiency improves.

Further, in this embodiment, during the operation within the first operating range A1, since the EGR valve 53 is controlled so that the external EGR ratio increases as the engine speed increases (see FIGS. 8 and 9) and the intake and exhaust VVTs 13a and 14a are controlled so that the internal EGR ratio decreases as the engine load increases (see FIGS. 10 to 12), in various speed and load conditions, the suitable ignitability is secured.

For example, since a moving speed of the piston 5 is higher as the engine speed increases, the combustion chamber 6 rapidly expands after the spark ignition, which easily interrupts the growth of the flame core. Further, the fuel injection amount from the injector 15 decreases as the engine load is reduced, which easily makes the air-fuel ratio of the mixture gas lean, and therefore it may be difficult to grow the flame core sufficiently after the spark ignition. In this regard, when the external EGR ratio and the internal EGR ratio are set as described above, since the external EGR ratio and the internal EGR ratio are both increased at the high engine speed and the low engine load condition, the compression start temperature of the combustion chamber 6 (the temperature at which the compression stroke is started) is sufficiently raised accompanying these increases in the internal EGR ratio and external EGR ratio. Thus, also in the most severe condition for ignitability due to the high engine speed and the low engine load, sufficient ignitability is secured and the SPCCI combustion is stabilized. On the contrary, in the condition most suitable for the ignitability by the low engine speed and the high engine load, since both of the external EGR ratio and the internal EGR ratio are reduced, the compression start temperature of the combustion chamber 6 is appropriately maintained according to the ignitability so as to prevent the abnormal combustion, such as pre-ignition.

Further, in this embodiment, during the operation within the first operating range A1, in the state where the opening of the swirl valve 18 is reduced to a relatively low opening (about 20 to 40%), that is, in a state where a swirl flow is formed inside the combustion chamber 6, the fuel is radially injected at a suitable timing (the timing when the spray of the fuel reaches the swirl flow) from the multi-hole injector 15 located at the center portion of the ceiling surface of the combustion chamber 6, and thus the stratified mixture gas in which the fuel concentration is higher in the center portion of the combustion chamber 6 than in the outer circumferential portion is formed (see FIGS. 15 and 16). With this configuration, a flame core is reliably formed by the spark ignition using the spark plug 16 within a relatively rich mixture gas formed in the center portion of the combustion chamber 6, and the SI combustion and the subsequent CI combustion are stabilized.

Especially in this embodiment, the inclined swirl flow which flows nonparallel to a plane perpendicular to the cylinder axis Z is formed as the swirl flow, and the position and orientation of each nozzle port of the injector 15 are set so that the fuel portion which reaches the swirl flow first (e.g., the fuel portion f1) moves downstream along the swirl flow and then joins with another fuel portion which reaches the swirl flow later (e.g., the fuel portion f2). Thus, the (relatively rich) mixture gas at a high fuel concentration is reliably formed in the center portion of the combustion chamber 6 which is the final destination of the swirl flow, and therefore, the stratification of the mixture gas described above is further stimulated.

Further in this embodiment, when the SPCCI combustion is performed (during the operation within the first and second operating ranges A1 and A2), the ignition timing by the spark plug 16 is adjusted so that θci which is the start timing of the CI combustion matches with a given target θci for each operating condition of the engine, in other words, so that the SI ratio correlated with θci (the ratio of the heat generation amount by the SI combustion with respect to the total heat generation amount) matches with the target SI ratio. Therefore, the ratio of the CI combustion is increased (i.e., the SI ratio is reduced) as much as possible within the range that the combustion noise does not become excessive, and the thermal efficiency by the SPCCI combustion is improved as much as possible.

(9) Modifications

In this embodiment, although within the base segment c1 where the engine speed is relatively low within the first operating range A1 where the SPCCI combustion is performed, the opening of the swirl valve 18 is set at the uniform value (20%) which is larger than the fully-closed state, it may be controlled to decrease as the engine speed decreases similar to within the main segment c2 which is the higher speed side of the base segment c1. Note that even in this case, the change rate of the opening of the swirl valve 18 with respect to the engine speed in the base segment c1 is desirably less than the change rate in the main segment c2.

In this embodiment, the opening of the swirl valve 18 may be changed in a stepwise fashion according to the engine speed as long as at least the opening is larger as the engine speed is higher.

In this embodiment, the swirl valve 18 is provided to one of the two intake ports 9A and 9B (the second intake port 9B) provided to one cylinder 2, and the opening of the swirl valve 18 is changed to adjust the intensity of the swirl flow. However, the method of adjusting the intensity of the swirl flow with a swirl mechanism is not limited to this. For example, the intensity of the swirl flow may be adjusted by setting the lift of the intake valve 11 which opens and closes the first intake port 9A and the lift of the intake valve 11 which opens and closes the second intake port 9B different from each other or the operating timings of these two intake valves 11 different from each other. In this manner, the intake valves 11 may be considered the "swirl mechanism."

Although in this embodiment, the booster 33 mechanically driven by the engine body 1 is provided in the intake passage 30, instead of such a mechanical booster 33 (supercharger), an electric booster driven by a motor, or a turbocharger driven by the energy of the exhaust gas may be provided.

Although in this embodiment, the cavity 20 having a donut shape in the plan view to surround the conical-shaped bulge portion 20a is formed in the crown surface of the piston 5, the concave portion of the cavity 20 facing the spark plug 16, that is, the concave portion located on the intake side of the bulge portion 20a, may be formed so as to be smaller than the concave portion on the opposite side (exhaust side). In this manner, when the fuel is injected from the injector 15 in the final stage of the compression stroke, fuel spray is moved to the vicinity of the electrode of the spark plug 16 more promptly.

Although in this embodiment, the intake and exhaust VVTs 13a and 14a are controlled to form the valve overlap period in which both the intake and exhaust valves 11 and 12 are opened over TDC of the exhaust stroke when performing the internal EGR in which the burned gas is left in the combustion chamber 6, conversely, the internal EGR may be performed by forming a so-called negative overlap period in which both the intake and exhaust valves 11 and 12 are closed over TDC of the exhaust stroke.

In this embodiment, the intake VVT 13a (exhaust VVT 14a) adopts the variable phase mechanism which simultaneously changes the open and close timings of the intake valve 11 (exhaust valve 12); however, the intake VVT 13a may be a variable mechanism of a type which only changes the open timing while fixing the close timing of the intake valve 11, and the exhaust VVT 14a may be a variable mechanism of a type which only changes the close timing while fixing the open timing of the exhaust valve 12. Further, the intake VVT 13a (exhaust VVT 14a) may be a variable mechanism of a type which changes the lift of the intake valve 11 (exhaust valve 12) in addition to the open/close timing.

In this embodiment, for each operating condition (speed/load) of the engine, the optimal SI ratio (target SI ratio) and the corresponding start timing of the CI combustion (target θci) with which combustion noise and thermal efficiency have a well-balanced relationship are determined in advance, and during the SPCCI combustion, the ignition timing for achieving the target SI ratio and the target θci (the correction amount from the target value) is obtained using the model formula based on the in-cylinder state functions at the given timing before the ignition (EGR ratio, temperature, etc.); however, alternatively/additionally to the ignition timing, the fuel injection timing from the injector 15 may be adjusted. Alternatively, both the fuel injection timing and amount may be adjusted.

In this embodiment, during the SPCCI combustion, the start timing of the CI combustion (θci) is calculated based on the waveform of the in-cylinder pressure detected by the in-cylinder pressure sensor SN2, and based on the calculated θci, the model formula is modified to correct the ignition timing; however, alternatively/additionally to θci, the SI ratio which is the ratio of the SI combustion may be calculated and the model formula may be corrected based on the SI ratio.

Note that when calculating the SI ratio of each combustion as described above, various specific methods can be considered to calculate this SI ratio.

For example, the heat generation rate at each crank angle timing may be calculated from the detected waveform by the in-cylinder pressure sensor SN2, and the areas R1 and R2 illustrated in FIG. 7 may be calculated based on the data (waveform) of the calculated heat generation rate. In this case, although the SI ratio may be calculated as SI ratio=R1/(R1+R2) as described above, alternatively, SI ratio=R1/R2 may be established.

Figure 18:
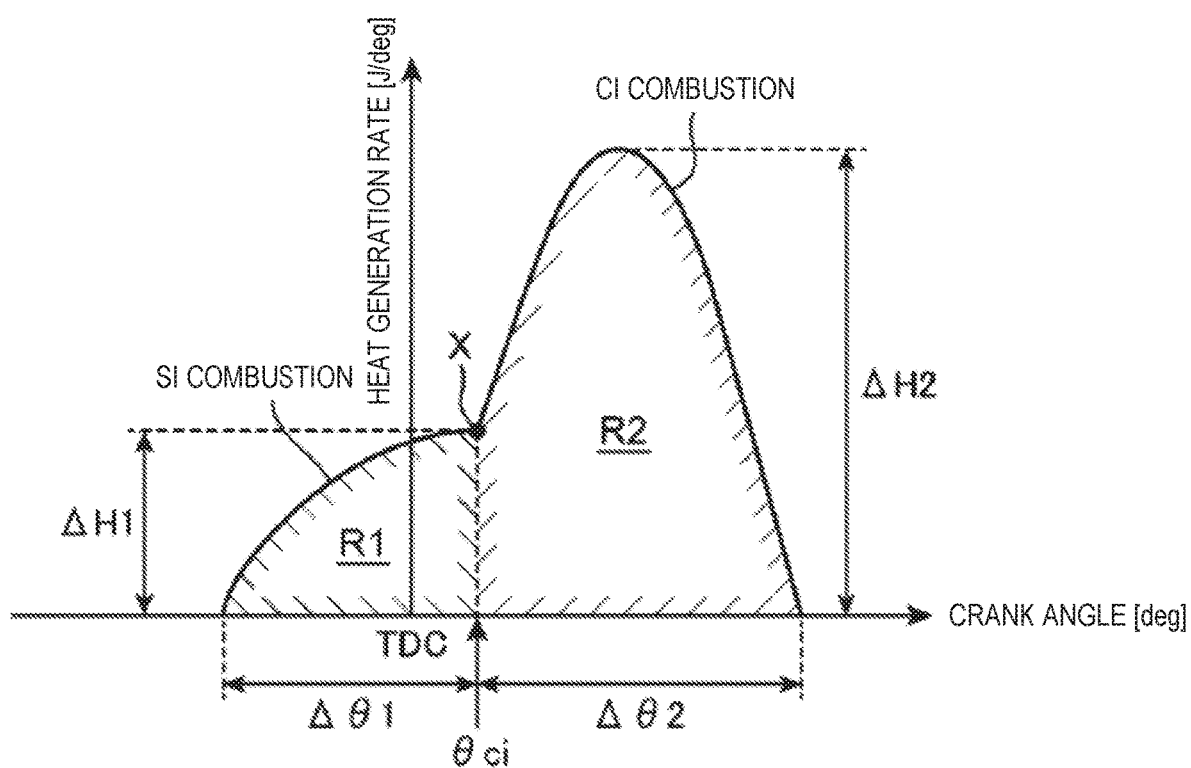
FIG. 18 is a chart corresponding to FIG. 7, illustrating various methods of defining an SI ratio.

Further, the SI ratio may be calculated using $\Delta\theta1$ and $\Delta\theta2$ illustrated in FIG. 18. That is, when the crank angle period of the SI combustion (the crank angle period on the advancing side of the flection point X) is $\Delta\theta1$ and the crank angle period of the CI combustion (the crank angle period on the retarding side of the flection point X) is $\Delta\theta2$, SI ratio=$\Delta\theta1/(\Delta\theta1+\Delta\theta2)$ or SI ratio=$\Delta\theta1/\Delta\theta2$ may be established.

Furthermore, when a peak of the heat generation rate of the SI combustion is $\Delta H1$ and a peak of the heat generation rate of the CI combustion is ΔH2, SI ratio=ΔH1/(ΔH1+ΔH2) or SI ratio=ΔH1/ΔH2 may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
6 Combustion Chamber
15 Injector
16 Spark Plug
18 Swirl Valve
40 Exhaust Passage
51 EGR Passage
53 EGR Valve
100 ECU (Controller)
S Boundary Speed (Given Value of Engine Speed)

What is claimed is:

1. A control system for a compression-ignition engine, comprising:
   an engine having a combustion chamber formed by a cylinder, a piston and a cylinder head;
   an injector attached to the engine and configured to supply fuel into the combustion chamber;
   a spark plug disposed to be oriented into the combustion chamber;
   a swirl valve provided to an intake passage of the engine; and
   a controller connected to the injector, the spark plug, and the swirl valve and configured to output a control signal to the injector, the spark plug, and the swirl valve, respectively, the controller including a processor configured to execute:
      a swirl adjusting module configured to change an opening of the swirl valve, the swirl adjusting module outputting a control instruction to the injector to inject the fuel after a control of the swirl valve; and
      a combustion controlling module to output an ignition instruction to the spark plug so as to ignite at a given ignition timing after an exhaust gas recirculation (EGR) ratio adjustment, so that partial compression-ignition combustion in which a mixture gas combusts by flame propagation and then combusts by compression ignition within a predetermined partial compression-ignition combustion operating range, is performed,
   wherein the swirl adjusting module outputs a control instruction to the swirl valve to make the opening of the swirl valve smaller as an engine load decreases within the partial compression-ignition combustion operating range, and make the opening of the swirl valve smaller as an engine speed decreases within the partial compression-ignition combustion operating range.

2. The control system of claim 1, wherein the swirl adjusting module controls the swirl valve so that a change rate of an intensity of swirl flow in a low engine speed range below a given engine speed is less than the change rate in a high engine speed range above the given engine speed.

3. The control system of claim 1, wherein during the partial compression-ignition combustion, the swirl adjusting module controls the opening of the swirl valve within a given opening range larger than the fully-closed state.

4. The control system of claim 1, wherein at least in a part of the partial compression-ignition combustion operating range, the swirl adjusting module controls the swirl valve to perform the partial compression-ignition combustion while forming an air-fuel (A/F) lean environment in which an air-fuel ratio that is a ratio of air to fuel inside the combustion chamber is larger than a stoichiometric air-fuel ratio.

5. The control system of claim 1, wherein the injector at least has a first nozzle port and a second nozzle port disposed at a center portion of a ceiling surface of the combustion chamber and separated from each other in a circumferential direction of the injector, the first and second nozzle ports simultaneously injecting the fuel,
   wherein the swirl flow is an inclined swirl flow flowing nonparallel to a plane perpendicular to a center axis of the combustion chamber, and
   wherein the first and second nozzle ports are positioned and oriented so that a first fuel portion injected by the first nozzle port that has reached the swirl flow moves downstream along the swirl flow and then joins with a second fuel portion injected by the second nozzle port that has reached the swirl flow.

6. The control system of claim 1, wherein during the partial compression-ignition combustion, the combustion controlling module adjusts a given control amount at least including a timing of the spark ignition so that a spark ignition (SI) ratio that is a ratio of a heat generation amount by the spark ignition combustion to a total heat generation amount matches a target SI ratio determined in advance for each operating condition of the engine.

7. A control system for a compression-ignition engine including an injector configured to supply fuel into a combustion chamber and a spark plug configured to ignite a mixture gas containing fuel supplied from the injector and air, the engine performing partial compression-ignition combustion including spark ignition (SI) combustion performed by combusting a portion of the mixture gas through spark ignition by the spark plug, followed by compression ignition (CI) combustion performed by causing the rest of the mixture gas to self-ignite, comprising:
   a swirl mechanism configured to adjust an intensity of swirl flow to be generated inside the combustion chamber; and
   a processor configured to, during the partial compression-ignition combustion within a predetermined partial compression-ignition combustion operating range;
   cause the injector to inject the fuel toward the swirl flow while controlling the swirl mechanism to:
      make an opening of the swirl mechanism smaller as an engine load decreases; and
      make the opening of the swirl mechanism smaller as an engine speed decreases; and
   cause the spark plug to perform spark ignition at a given ignition timing so that the SI combustion of the mixture gas is performed followed by the CI combustion.

8. The control system of claim 7,
   wherein within a segment below a boundary speed within the partial compression-ignition combustion operating range, the processor is configured to set the opening of the swirl mechanism to a constant opening regardless of the engine speed; and
   wherein within a segment above the boundary speed within the partial compression-ignition combustion operating range make the opening of the swirl mechanism smaller as the engine speed decreases.

* * * * *